(12) United States Patent
Dalton et al.

(10) Patent No.: US 12,248,936 B2
(45) Date of Patent: Mar. 11, 2025

(54) USER ACTIVITY DETECTION FOR LOCKING CRYPTOCURRENCY CONVERSIONS

(71) Applicant: PAYPAL, INC., San Jose, CA (US)

(72) Inventors: Charles Gabriel Neale Dalton, San Jose, CA (US); Michael Charles Todasco, Santa Clara, CA (US); Michael Jim Tien Chan, San Jose, CA (US); Suryatej Gundavelli, San Jose, CA (US); John Lucas Timoney, Bronxville, NY (US)

(73) Assignee: PAYPAL, INC., San Jose, CA (US)

( * ) Notice: Subject to any disclaimer, the term of this patent is extended or adjusted under 35 U.S.C. 154(b) by 262 days.

(21) Appl. No.: 17/545,915

(22) Filed: Dec. 8, 2021

(65) Prior Publication Data
US 2023/0177507 A1    Jun. 8, 2023

(51) Int. Cl.
*G06Q 20/40* (2012.01)
*G06Q 20/06* (2012.01)
*G06Q 20/38* (2012.01)

(52) U.S. Cl.
CPC ....... *G06Q 20/4014* (2013.01); *G06Q 20/065* (2013.01); *G06Q 20/381* (2013.01); *G06Q 20/38215* (2013.01); *G06Q 20/3827* (2013.01); *G06Q 20/405* (2013.01)

(58) Field of Classification Search
None
See application file for complete search history.

(56) References Cited

U.S. PATENT DOCUMENTS

| | | | | |
|---|---|---|---|---|
| 2019/0340586 A1* | 11/2019 | Sheng | ................. | G06Q 20/367 |
| 2020/0364686 A1* | 11/2020 | Millius | ................ | G06Q 20/065 |
| 2020/0402087 A1* | 12/2020 | McGinnis | .............. | G06Q 40/04 |

(Continued)

FOREIGN PATENT DOCUMENTS

| | | | | |
|---|---|---|---|---|
| WO | WO-2020104961 A1 * | 5/2020 | | |
| WO | WO-2022049218 A1 * | 3/2022 | ............. | G06Q 20/02 |

OTHER PUBLICATIONS

Fu, Z., "An intelligent cross-border transaction system based on consortium blockchain: A case study in Shenzhen, China", PLoS One16.6: e0252489. Public Library of Science. (Jun. 2021) (Year: 2021).*

*Primary Examiner* — Clay C Lee
(74) *Attorney, Agent, or Firm* — Haynes and Boone, LLP

(57) ABSTRACT

Methods and systems described herein may implement blockchain cryptocurrency transactions in a variety of environments. An online transaction processor may provide operations for user activity detection for locking cryptocurrency conversions. The transaction processor may detect used activities for a user online or at a physical location and determine that those activities indicate that the user will engage in electronic transaction processing at an upcoming time. The transaction processor may determine that the user has available cryptocurrency and may want to convert at least a portion of the cryptocurrency to another currency for the electronic transaction processing. Using a cryptocurrency exchange, the transaction processor may determine a price to convert the cryptocurrency to the other currency and may lock that price for a time period for the user. A notification may be transmitted to the user with a user interface element to accept this offer.

20 Claims, 15 Drawing Sheets

(56) References Cited

U.S. PATENT DOCUMENTS

2021/0073753 A1* 3/2021 Shtylman ............ G06Q 20/0658
2021/0350373 A1* 11/2021 Spalding .............. G06Q 20/065
2022/0051219 A1* 2/2022 Sells ......................... H04L 9/50
2022/0188811 A1* 6/2022 Petersen ............ G06Q 20/3676

* cited by examiner

USER ACTIVITY DETECTION FOR LOCKING CRYPTOCURRENCY CONVERSIONS

TECHNICAL FIELD

The present disclosure generally relates to blockchain technology and hardware and software related thereto. More specifically, the present disclosure relates to systems and methods for implementing blockchain in a variety of environments, including cryptocurrency conversions.

BACKGROUND

Users may utilize online electronic transaction processors to process transactions between end users as well as exchange and transfer funds. This may include transactions at physical merchant locations with real-world merchants, as well as online transactions on digital merchant marketplaces and the like. Users may have available cryptocurrency, but that cryptocurrency may not be accepted by certain merchants. Thus, users may want to exchange cryptocurrency into another currency, especially where the user may be travelling or using a currency that the user may not have an available or sufficient balance. However, when performing these currency exchanges and/or sales of cryptocurrency, users may need to predict that the users will need the other currency. Accessing a cryptocurrency wallet and/or cryptocurrency exchange platform to sell cryptocurrency may be time consuming, require multiple authentication factors, and/or require trust parameters, which does not make such operations feasible when actively engaging in electronic transaction processing. Thus, it is desirable to provide users with more reliable cryptocurrency exchanges in real-time when a user is expected to engage in electronic transaction processing.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

DETAILED DESCRIPTION

Figure 1:
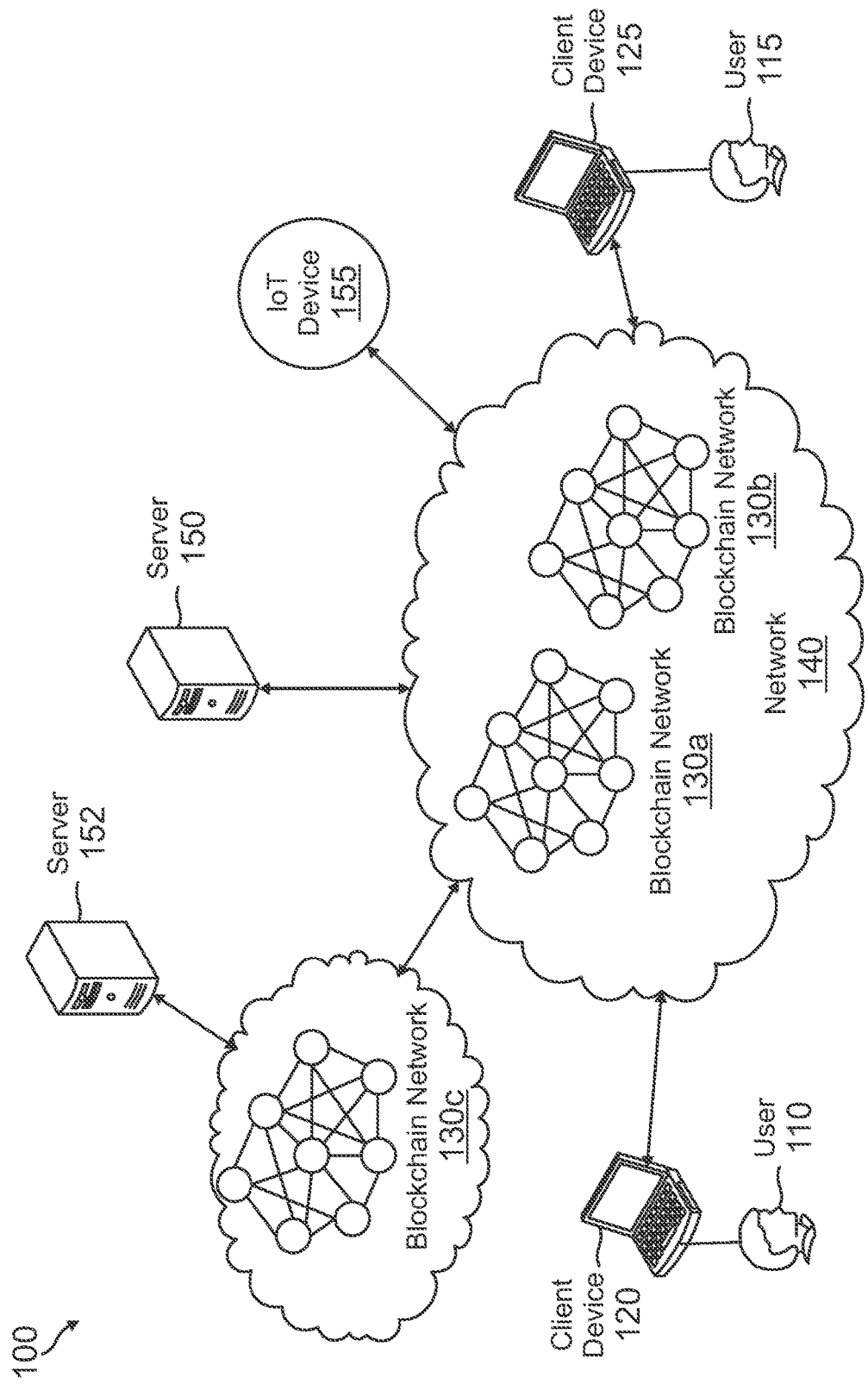
FIG. 1 illustrates an environment of an exemplary computing architecture for facilitating one or more blockchain based transactions, according to an embodiment.

In the following description of the various embodiments, reference is made to the accompanying drawings identified above and which form a part hereof, and in which is shown by way of illustration various embodiments in which aspects described herein may be practiced. It is to be understood that other embodiments may be utilized, and structural and functional modifications may be made, without departing from the scope described herein. Various aspects are capable of other embodiments and of being practiced or being carried out in various different ways.

In its broadest sense, blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others the distributed ledger represents each transaction where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. In some embodiments described herein, blockchains and cryptocurrency may be utilized to provide locking of conversions for cryptocurrency into one or more other currencies. For example, smart contracts, cryptocurrency locking mechanism, and the like may be used to provide, verify, and lock-in for a time period, a value of a cryptocurrency in values or amounts for one or more other currencies, which may include fiat currencies, virtual currencies (e.g., credit card or bank points, virtual assets, NFTs, loyalty or reward points, etc.), and/or other cryptocurrencies. This may be used to exchange or sell the cryptocurrency at a verifiable price over the time period on one or more cryptocurrency exchange platforms. These operations may be provided by these cryptocurrency exchange platforms as well as other online digital transaction processors and/or service providers. For example, online transaction processors, such as PayPal® or Venmo®, may be user to process transactions electronically using cryptocurrency, fiat currency, and the like, which may provide users with the functionality to convert or sell cryptocurrency available to or held by the user in order to process a transaction in another currency.

In order to offer a user a locked cryptocurrency sale or conversion price for a time period, an online transaction processor may first verify that a user is likely to want to convert or sell cryptocurrency to obtain another currency used for a transaction. For example, the online transaction processor may predict that the user is likely to engage in electronic transaction processing that requires an amount of funds in a conventional currency. However, the online transaction processor may further predict the user may process the transaction using a non-conventional currency, such as cryptocurrency, which would then require a conversion (e.g., by converting to the other currency required by the merchant or user in the transaction, transfer, payment, or the like). In order to limit loss and risk based on variances in cryptocurrency values and/or conversion rates, the online transaction processor may determine that the user is likely to engage in the transaction in a short amount of time, such as in the next minute to one hour or the like. As cryptocurrency values may change quickly, this may be used to implement a net zero policy where the online transaction processor offers this service with higher costs to end users and customers of the transaction processor that may occur when cryptocurrency prices change.

User activities detected to determine a user may engage in a transaction, using conventional or cryptocurrency, may include both real-world and/or online digital activities and interactions. For example, real-world activities may correspond to those engaged in by a user at a physical merchant location, which may include entering a merchant location, placing an order, reviewing or examining an item for purchase, requesting a service for use and/or purchase, adding items to a physical shopping cart or the like, walking up to or standing in a checkout line, or the like. In some embodiments, these activities may be detected by a wireless transceiver configured to broadcast a short-range wireless signal over a proximity range at the physical merchant location, a geo-location transceiver for the user, a mobile device of the user, a microphone, a camera, a biometric detector, a movement detector, or an Internet of Things sensor. Further, an edge network may be used for the physical merchant location and activity detection and storage. With online digital activities, the activities may include selecting an item for purchase on a merchant website or within a merchant application, entering a transaction processing and/or checkout flow, generation of a digital transaction, addition of items to a digital shopping cart, browsing or search for items, or otherwise indicating an item for purchase by the user. These digital activities may be retrieved and/or received from a networked device or server.

Based on these activities, the online transaction processor may predict whether the user may or will engage in electronic transaction processing and require or request a conversion or sale of cryptocurrency to obtain funds in another currency for processing the corresponding transaction. The prediction may be made using a rule-based artificial intelligence (AI) and/or a model-based machine learning (ML) or neural network (NN) engine or system. These may be generated by coding rules and variables for a rule-based system and/or training features, variables, and layers of a model-based system using training data. Thereafter, the user activities and any additional data (e.g., the further cryptocurrency usage data, required funds for a transaction, and the like that are further discussed herein) as input to the corresponding engine and/or system and receiving an output score or other output value or decision. Thereafter, the predictive output may be used to determine if the inputs meet or exceed a threshold score, value, or the like. If so, the online transaction processor may then further determine and lock a first amount of a selected cryptocurrency for conversion or sale to obtain a second amount of a currency used for the transaction.

Once it is predicted that the user is likely to engage in electronic transaction processing using a balance available to the user in a digital account or wallet of the user, the transaction processor may determine a transaction total or balance due, which may include an item cost, tax, tip, and/or the like. Certain amounts may be predicted, such as a tip amount or donation where the transaction has not been determined, or the transaction's costs and total may be extracted from available data from a physical merchant location or digital merchant marketplace. The transaction processor may then determine that the user does not have the transaction amount or total in a required currency and/or that the user would prefer to use a cryptocurrency for payment of the transaction (e.g., through sale or conversion). The online transaction processor may determine or predict what other currencies are accepted by the merchant, including different fiat, virtual, or cryptocurrencies.

Based on these currencies, the transaction processor may predict or suggest a cryptocurrency that the user may wish to sell or convert to obtain the required funds for the transaction. The transaction processor may make this prediction based on preferences by the user to buy, sell, or hold certain cryptocurrencies, available balances for the user for cryptocurrencies, fiat currencies and the like, a purchase or a sale of a cryptocurrency within a time period, an indication to use a cryptocurrency for the transaction, a percentage change in cryptocurrency values over a previous time period, a moving average of cryptocurrency values, a negative trend or a positive trend in cryptocurrency values, a market capitalization of one or more cryptocurrencies, predicted future usage of cryptocurrency balance based on prior transactions, or a trading volume of one or more cryptocurrencies. In some embodiments, more than one cryptocurrency may be selected for conversion or sale on behalf of the user, such as a top two or three cryptocurrencies the user is likely to use based on preferences, availability, sale or conversion prices and trends, and the like. The predictions may also be based on a conversion policy to obtain a net zero balance of remaining funds after cryptocurrency conversions on behalf of users.

Once the cryptocurrency potentially used by the user is predicted, the online transaction processor may determine a sale price and/or conversion rate of the cryptocurrency that may be locked-in for the user for a period of time in order to process the transaction by obtaining the alternative currency. When determining the price or rate to be offered to the user over the time period, the service provider may utilize information about the cryptocurrency pricing (e.g., the aforementioned percentage change in cryptocurrency values over a previous time period, a moving average of cryptocurrency values, a negative trend or a positive trend in cryptocurrency values, a market capitalization of one or more cryptocurrencies, upcoming events that may drive up or down the specific cryptocurrency value, or a trading volume of one or more cryptocurrencies), as well as a cryptocurrency conversion or sale policy of the transaction processor to attempt to achieve a net zero balance on behalf of the service provider after selling or converting cryptocurrencies into other currencies on behalf of users. However, the transaction processor may overvalue or undervalue pricing and rates of the cryptocurrency on behalf of customers, merchants, and end users of the transaction processor.

When determining the cryptocurrency conversion rate or sale price for the user, the online transaction processor may set that rate or price for a time period during which, the user is expected to checkout. Further, the time period may also be determined and/or adjusted, such as based on a predicted amount of time until the user performs a checkout and completes electronic transaction processing. Thereafter, the transaction processor may lock this rate and time period for the user. This may include locking an amount of the cryptocurrency with an amount of the fiat or other currency in a multi-key hash-based digital locking mechanism, which may prevent exchange of digital encryption keys until each side agrees to the conversion or sale and/or a time expires, and at expiration of the time, each amount of funds may be returned to the respective user. The conversion rate or sale price may remain static at the rate determined by the transaction processor until expiration of the time, at which time, it may no longer be offered to the user unless an extension is requested and/or provided by the transaction processor. However, large detected fluctuations and/or changes in price or rate may cause early or later expiration of the offer to the user, however, the cryptocurrency conversion policy may be adapted to prevent or minimize such expirations so as to avoid bad user experiences.

The user may then be notified of the availability of the conversion or sale offer of the cryptocurrency in order to obtain the particular cryptocurrency for the transaction. A notification, alert, or other message may be transmitted to the user that includes the offer, as well as a selectable interface element that may be used to accept, decline, or request an extension of the offer associated with the cryptocurrency. The selectable interface element may include a link, interface icon, application icon or menu selection, and/or the like that may execute an operation to transmit an API call or request that accepts or declines the conversion or sale offer. If the time period for the offer expires, the offer may be considered expired, and the selectable interface element may no longer be valid. However, and as previously discussed, the interface element may remain valid if the user and/or transaction processor requests extension of the offer.

However, if the user accepts the offer via the selectable interface element, the transaction processor may execute one or more operations with a cryptocurrency exchange platform to convert or sell the cryptocurrency in order to obtain an amount of funds in the other, selected, currency. An amount of funds from the user (e.g., available in an online digital wallet or cold offline cryptocurrency wallet, as well as via an account with one or more cryptocurrency exchange platforms, cryptocurrency holders, and/or online transaction processors) may be obtained and used to execute the conversion, exchange, or sale of the cryptocurrency to obtain the alternative currency used for the pending transaction. The amount of the alternative currency may then be provided (e.g., as fiat currency in a digital account or the like) to the user in order to process the transaction. However, in other embodiments, the online transaction processor may immediately process the transaction using the obtained amount of the currency from the provided amount of the currency. Where any overage of fees may occur from the conversion or sale of the cryptocurrency, such amount may be remitted by the transaction processor to an account or digital wallet of the user. Such remittance may include providing back in the same cryptocurrency originally sold in order to maintain the zero net balance policy of the transaction processor.

For electronic transaction processing and digital payments made using these balances and utilizing these services, an online service provider (e.g., an online transaction processor, such as PAYPAL®) may provide account services to users of the online service provider, as well as other entities requesting the services. A user wishing to establish the account may first access the online service provider and request establishment of an account. An account and/or corresponding authentication information with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may be required to provide financial information, including payment card (e.g., credit/debit card) information, bank account information, gift card information, benefits/incentives, and/or financial investments. This information may be used to process transactions for items and/or services including purchases associated with a location visited by a user that is associated with an edge computing storage. Further, the incentives and past purchases may be provided to one or more edge computing storages, and/or used by the service provider when providing data to the edge computing storage(s). In some embodiments, the account creation may establish account funds and/or values, such as by transferring money into the account and/or establishing a credit limit and corresponding credit value that is available to the account and/or card. This may also include loading cryptocurrency to the account and/or integrating a cryptocurrency wallet (e.g., an offline cold wallet and/or wallet on a cryptocurrency exchange platform). The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and other transaction processing services. Once the account of the user is established with the service provider, the user may utilize the account via one or more computing devices, such as a personal computer, tablet computer, mobile smart phone, or the like.

Implementations of the present disclosure will now be described in detail with reference to the accompanying Figures. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

As discussed above, the distributed ledger in a blockchain framework is stored, maintained, and updated in a peer-to-peer network. In one example the distributed ledger maintains a number of blockchain transactions. FIG. 1 shows an example system 100 for facilitating a blockchain transaction. The system 100 includes a first client device 120, a second client device 125, a first server 150, a second server 152, and an Internet of Things (IoT) device 155 interconnected via a network 140. The first client device 120, the second client device 125, the first server 150, and/or the second server 152 may be a computing device 1105 described in more detail with reference to FIG. 11. The IoT device 155 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. The network 140 may be any of a variety of available networks, such as the Internet, and represents a worldwide collection of networks and gateways to support communications between devices connected to the network 140. The system 100 may also comprise one or more distributed or peer-to-peer (P2P) networks, such as a first, second, and third blockchain networks 130a-c (generally referred to as blockchain networks 130). As shown in FIG. 1, the network 140 may comprise the first and second blockchain networks 130a and 130b. The third blockchain network 130c may be associated with a private blockchain as described below with reference to FIG. 2 and is connected to one or more servers, such as the server 152, and is thus, shown separately from the first and second blockchain networks 130a and 103b. Each blockchain network 130 may comprise a plurality of interconnected devices (or nodes) as described in more detail with reference to FIG. 2. As discussed above, a ledger, or blockchain, is a distributed database for maintaining a growing list of records comprising any type of information. A blockchain, as described in more detail with reference to FIG. 3, may be stored at least at multiple nodes (or devices) of the one or more blockchain networks 130.

In one example, a blockchain based transaction may generally involve a transfer of data or value between entities, such as the first user 110 of the first client device 120 and the second user 115 of the second client device 125 in FIG. 1. Each of the servers 150 and 152 may include one or more applications, for example, a transaction application configured to facilitate the transaction between the entities by utilizing a blockchain associated with one of the blockchain networks 130. As an example, the first user 110 may request or initiate a transaction with the second user 115 via a user application executing on the first client device 120. The transaction may be related to a transfer of value or data from the first user 110 to the second user 115. The first client device 120 may send a request of the transaction to the server 150. The first server 150 and/or the second server 152 may send the requested transaction to one of the blockchain networks 130 to be validated and approved as discussed below.

Blockchain Network

Figure 2:
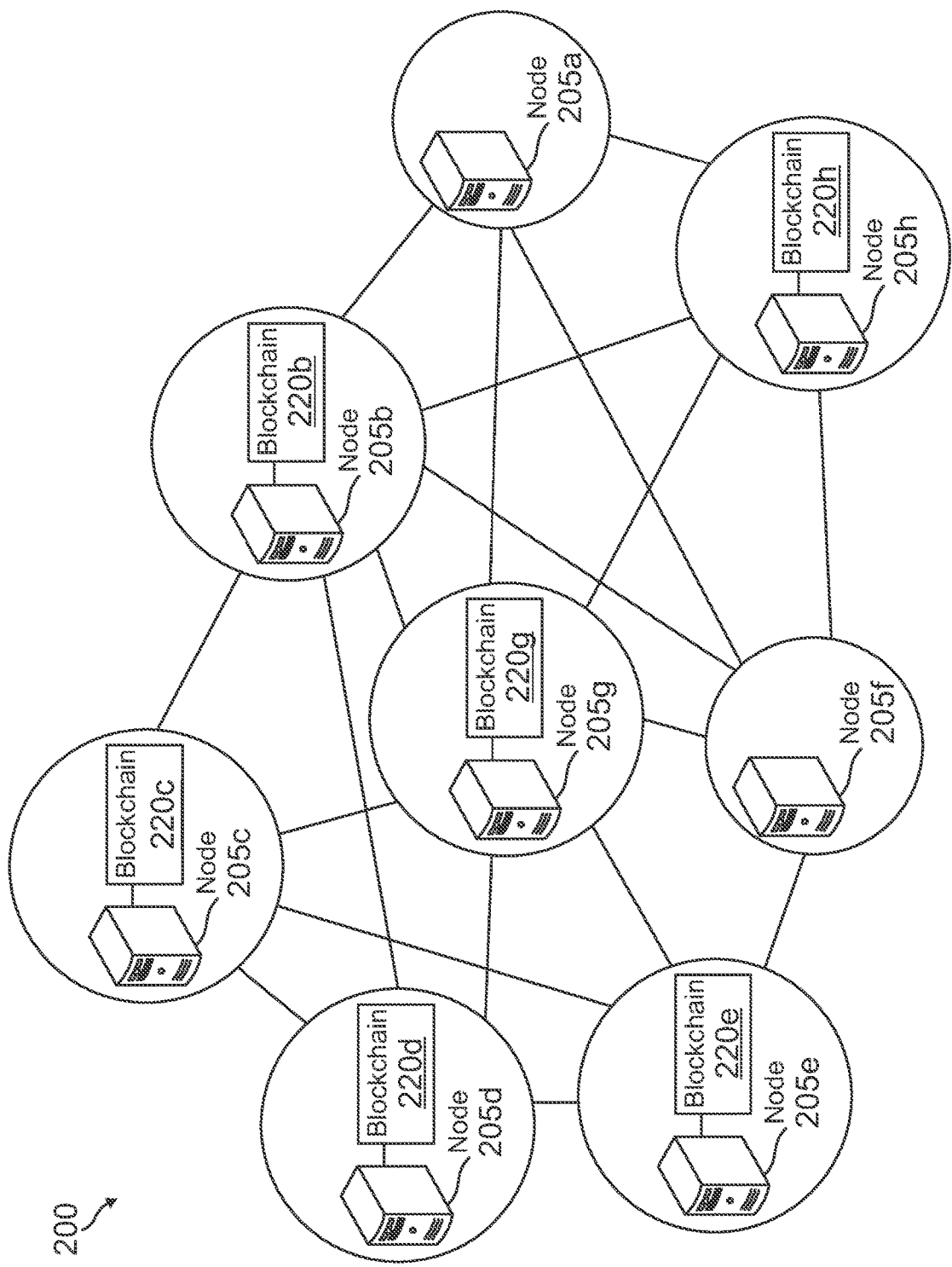
FIG. 2 illustrates an environment of an exemplary blockchain network, according to an embodiment.
Figure 3:
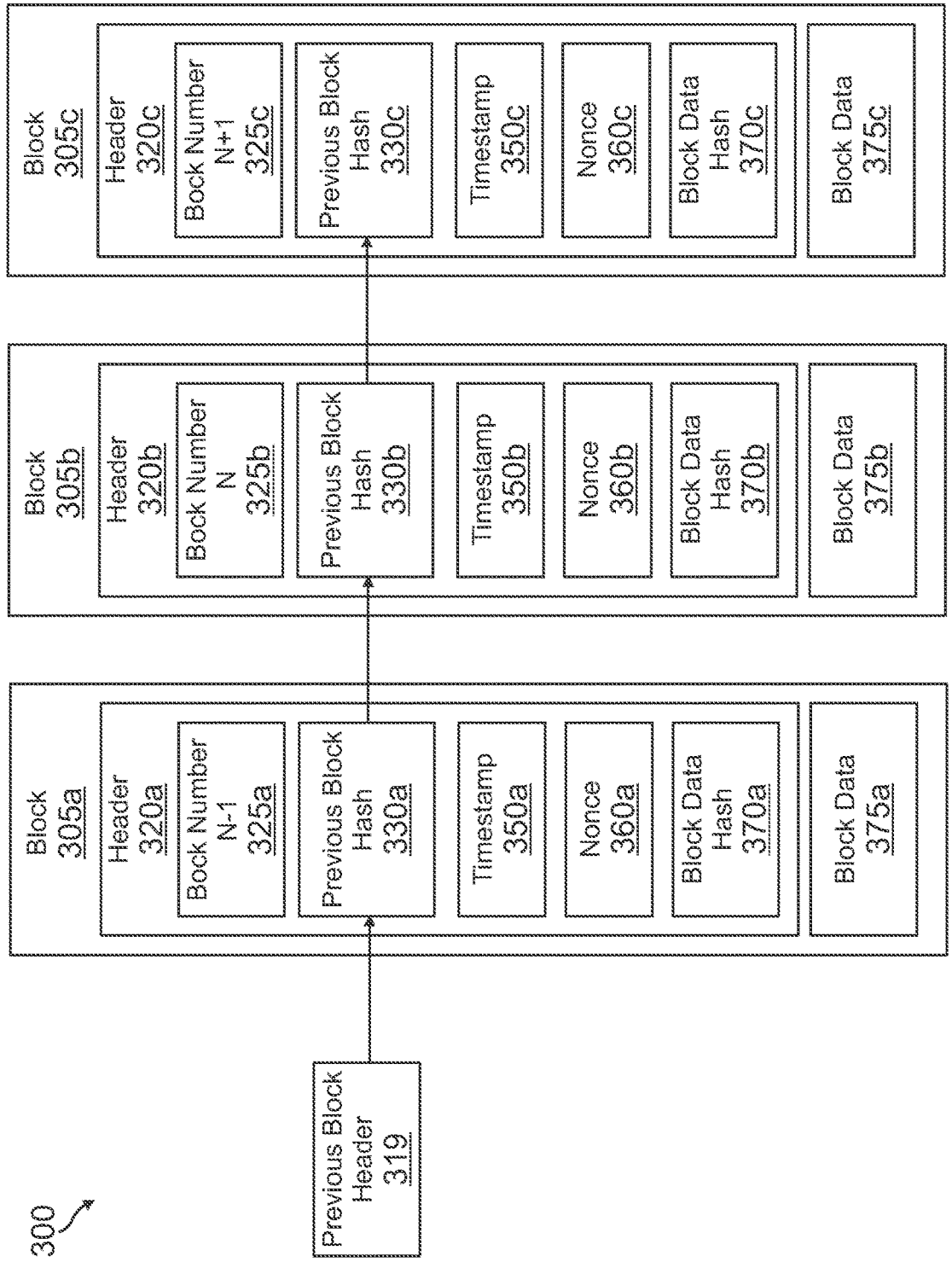
FIG. 3 illustrates a block diagram of an exemplary blockchain, according to an embodiment.

FIG. 2 shows an example blockchain network 200 comprising a plurality of interconnected nodes or devices 205a-h (generally referred to as nodes 205). Each of the nodes 205 may comprise a computing device 1105 described in more detail with reference to FIG. 11. Although FIG. 2 shows a single device 205, each of the nodes 205 may comprise a plurality of devices (e.g., a pool). The blockchain network 200 may be associated with one or more blockchains 220a-h (generally referred to as blockchain 220). Some or all of the nodes 205 may replicate and save an identical copy of the blockchain 220. For example, FIG. 3 shows that the nodes 205b-e and 205g-h store copies of the blockchain 220. The nodes 205b-e and 205g-h may independently update their respective copies of the blockchain 220 as discussed below.

Blockchain Node Types

Blockchain nodes, for example, the nodes 205, may be full nodes or lightweight nodes. Full nodes, such as the nodes 205b-e and 205g-h, may act as a server in the blockchain network 200 by storing a copy of the entire blockchain 220 and ensuring that transactions posted to the blockchain 220 are valid. The full nodes 205b-e and 205g-h may publish new blocks on the blockchain 220. Lightweight nodes, such as the nodes 205a and 205f, may have fewer computing resources than full nodes. For example, IoT devices often act as lightweight nodes. The lightweight nodes may communicate with other nodes 205, provide the full nodes 205b-e and 205g-h with information, and query the status of a block of the blockchain 220 stored by the full nodes 205b-e and 205g-h. In this example, however, as shown in FIG. 2, the lightweight nodes 205a and 205f may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

As discussed above, a blockchain 220 may be associated with a blockchain network 200. FIG. 3 shows an example blockchain 300. The blockchain 300 may comprise a plurality of blocks 305a, 305b, and 305c (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205b-e and 205g-h, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 3, the block number 325a of the block 305a is N−1, the block number 325b of the block 305b is N, and the block number 325c of the block 305c is N+1. The headers 320 of the blocks 305 may include a data field comprising a block size (not shown).

The blocks 305 may be linked together and cryptographically secured. For example, the header 320b of the block N (block 305b) includes a data field (previous block hash 330b) comprising a hash representation of the previous block N−1's header 320a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360a-c is an arbitrary string that is concatenated with (or appended to) the hash of the block. The headers 320 may comprise other data, such as a difficulty target.

The blocks 305 may comprise a respective block data 375a, 375b, and 375c (generally referred to as block data 375). The block data 375 may comprise a record of validated transactions that have also been integrated into the blockchain 200 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 1, the first server 150 and/or the second server 152 may include one or more applications, for example, a transaction application configured to facilitate a blockchain transaction between entities. The entities may include users, devices, etc. The first user 110 may request or initiate a transaction with the second user 115 via a user application executing on the first client device 120. The transaction may be related to a transfer of value or data from the first user 110 to the second user 115. The value or data may represent money, a contract, property, records, rights, status, supply, demand, alarm, trigger, or any other asset that may be represented in digital form. The transaction may represent an interaction between the first user 110 and the second user 115.

Figure 4:
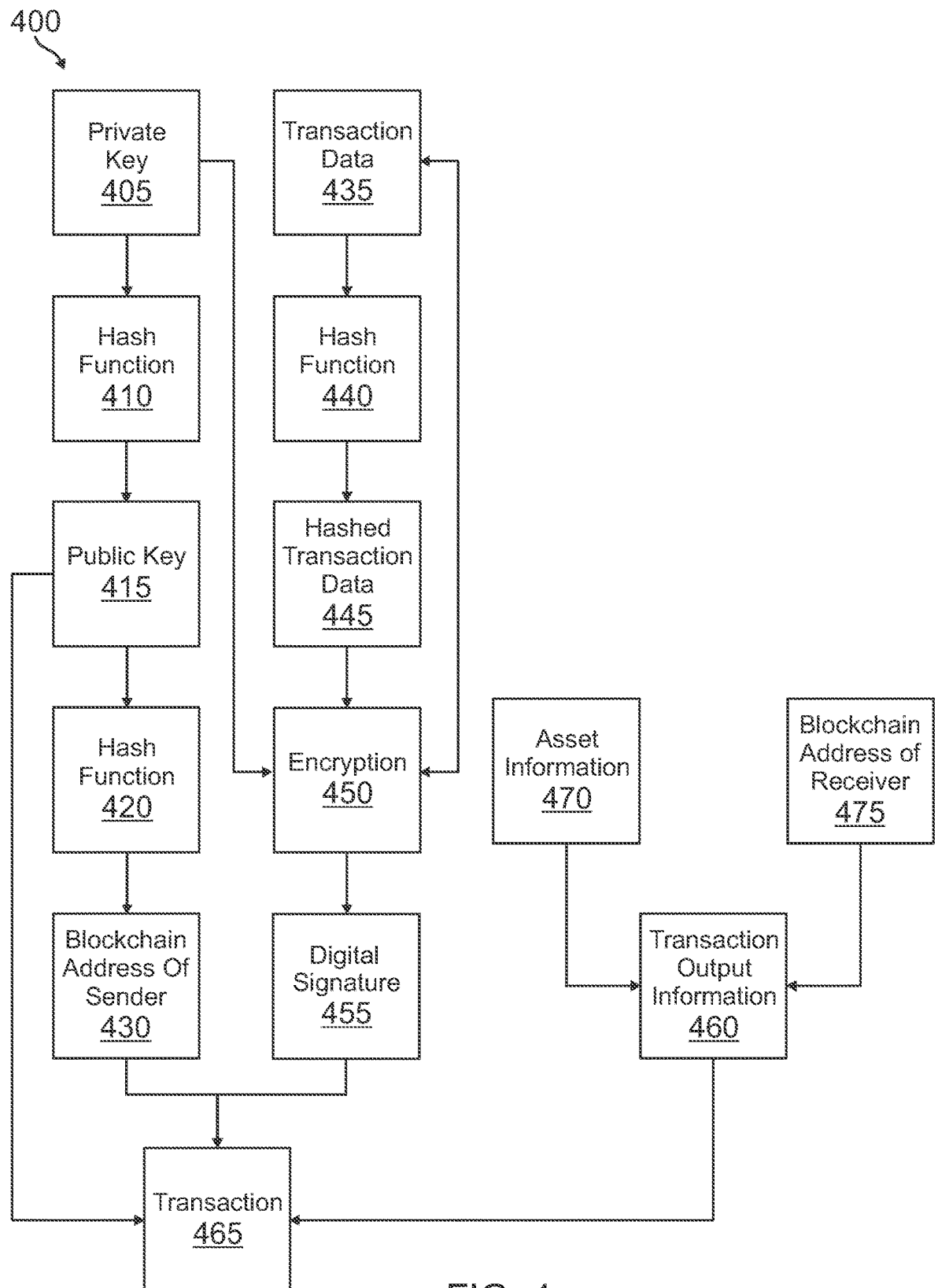
FIG. 4 illustrates a block diagram of an exemplary transaction message, according to an embodiment.

FIG. 4 is a diagram of a transaction 465 generated by the transaction application. The transaction 465 may include a public key 415, a blockchain address 430 associated with the first user 110, a digital signature 455, and transaction output information 460. The transaction application may derive a public key 415 from a private key 405 of the first user 110 by applying a cryptographic hash function 410 to the private key 405. The cryptographic hash function 410 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first user 110, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first user 110 is the originator of the transaction 465, the transaction application may generate the digital signature 455 for the transaction data 435 using the private key 405 of the first user 110. The transaction data 435 may include information about the assets to be transferred and a reference to the sources of the assets, such as previous transactions in which the assets were transferred to the first user 110 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 110 resulting in the digital signature 455. The transaction output information 460 may include asset information 470 and an address or identifier for the second user 115, such as the blockchain address 475. The transaction 465 may be sent from the first client device 125 to the first server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 110, shown in FIG. 4 as the blockchain address of sender 430, may include an alphanumeric string of characters derived from the public key 415 of the first user 110 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
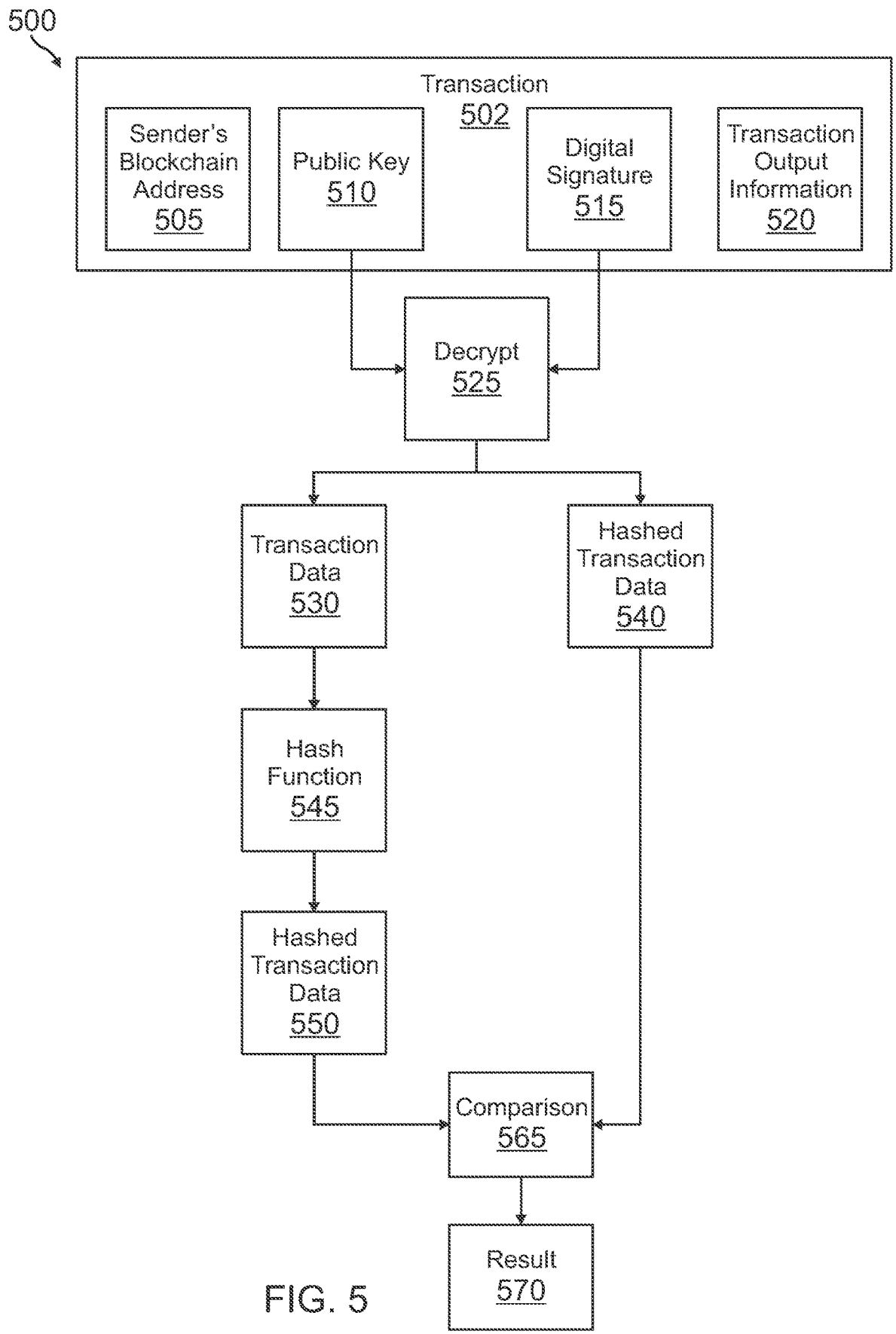
FIG. 5 illustrates a block diagram of an exemplary transaction broadcast the blockchain network, according to an embodiment.

The first server 150 may receive transactions from users of the blockchain network 130. The transactions may be submitted to the first server 150 via desktop applications, smartphone applications, digital wallet applications, web services, or other software applications. The first server 150 may send or broadcast the transactions to the blockchain network 130. FIG. 5 shows an example transaction 502 broadcast by the server 150 to the blockchain network 130. The transaction 502 may be broadcast to multiple nodes 205 of the blockchain network 130. Typically, once the transaction 502 is broadcast or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcasted to one or more specific nodes based on criteria related to the node's geography, history, reputation, market conditions, docket/delay, technology platform. The rules may be dynamically modified or updated (e.g., turned on or off) to address issues such as latency, scalability and security conditions. A transaction may be broadcast to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first user 110 is the originator of the transaction 465 by including the digital signature 455.

The node 205 may decrypt the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205a may create a first block comprising transactions "A," "B," and "C." Another full node 205b may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access a user's public/private keys may access the user's assets. While the assets may be recorded on the blockchain, the user may not be able to access them without the private key.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the tokens at the address. Thus, the blockchain address may represent an identity of the person that owns the tokens. Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by the validation nodes 205 of the blockchain network 130.

In a proof of work consensus model, a node validates a transaction, for example, by running a check or search through the current ledger stored in the blockchain. The node will create a new block for the blockchain that will include the data for one or more validated transactions (see, e.g., block 375 of FIG. 3). In a blockchain implementation such as Bitcoin, the size of a block is constrained. Referring back to FIG. 3, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally-intensive operation is needed at the node to determine an appropriate nonce value through a "brute force" trial-and-error method. Once a successful nonce value is determined, the completed block is published to the blockchain network for validation. If validated by a majority of the nodes in the blockchain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue it causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcasted to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below. The proof of stake model is generally less computationally intensive than the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g. in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcasted to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a fork. This type of fork may be resolved by the longest chain rule of the proof of work consensus model. According to the longest chain rule, if two versions of the blockchain exist, then the network the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute the update blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain-Based Application: Cryptocurrency

Cryptocurrency is a medium of exchange that may be created and stored electronically in a blockchain, such as a the blockchain 130a in FIG. 1. Bitcoin is one example of cryptocurrency, however there are several other cryptocurrencies. Various encryption techniques may be used for creating the units of cryptocurrency and verifying transactions. As an example, the first user 110 may own 10 units of a cryptocurrency. The blockchain 130a may include a record indicating that the first user 110 owns the 10 units of cryptocurrency. The first user 110 may initiate a transfer of the 10 units of cryptocurrency to the second user 115 via a wallet application executing on the first client device 120. The wallet application may store and manage a private key of the first user 110. Examples of the wallet device include a personal computer, a laptop computer, a smartphone, a personal data assistant (PDA), etc.

Figure 6A:
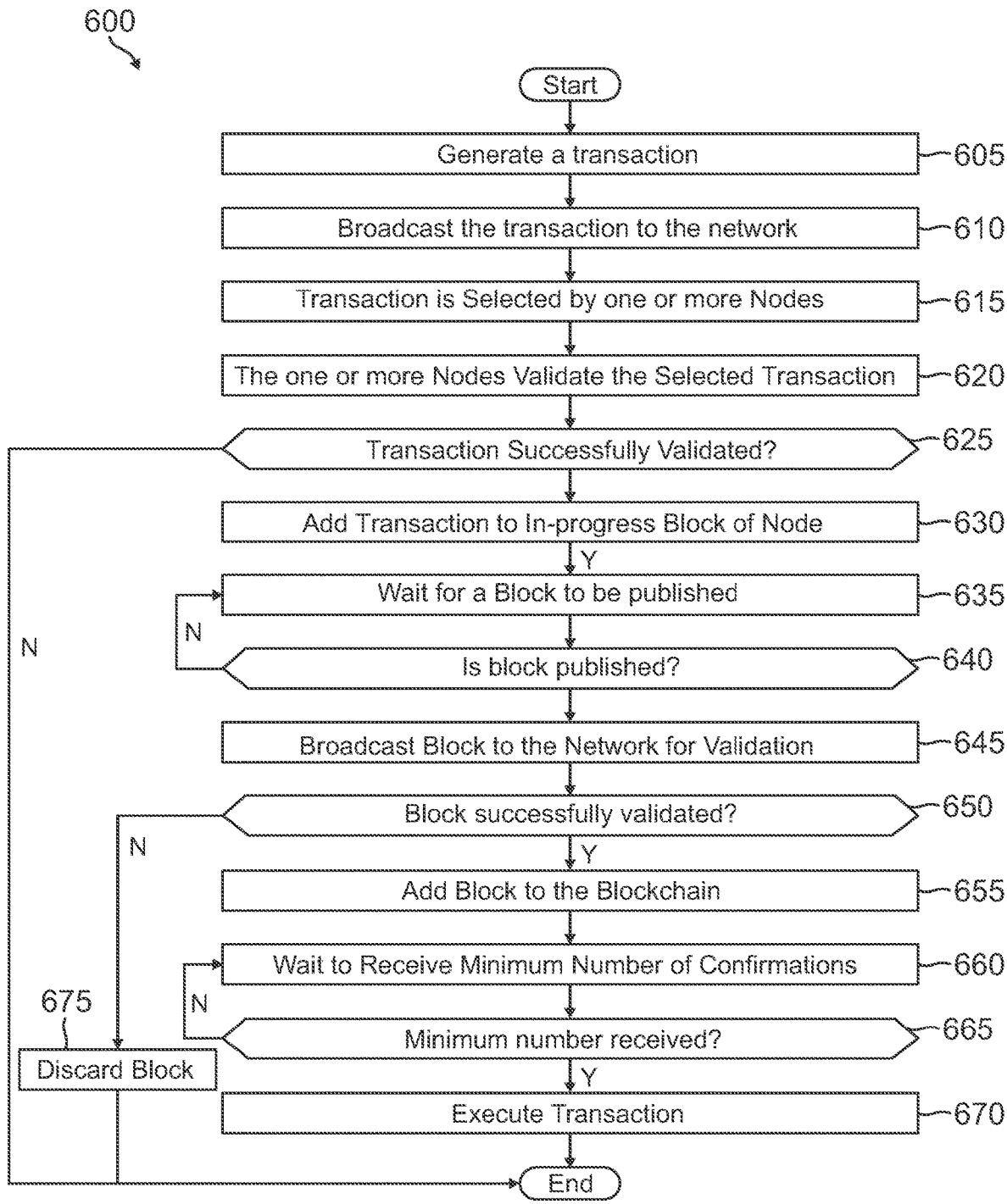
FIG. 6A illustrates a flow diagram showing steps of an example method for performing a blockchain based transaction, according to an embodiment.

FIG. 6A is a flow diagram showing steps of an example method 600 for performing a blockchain transaction between entities, such as the first user 110 of the first client device 120 and the second user 115 of the second client device 125 in FIG. 1. The steps of the method 600 may be performed by any of the computing devices shown in FIG. 1. Alternatively or additionally, some or all of the steps of the method 600 may be performed by one or more other computing devices. Steps of the method 600 may be modified, omitted, and/or performed in other orders, and/or other steps added.

At step 605, the wallet application may generate transaction data for transferring the 10 units of cryptocurrency from the first user 110 to the second user 120. The wallet application may generate a public key for the transaction using the private key of the first user 110. In order to indicate that the first user 110 is the originator of the transaction, a digital signature may also be generated for the transaction using the private key of the first user 110. As discussed with reference to FIG. 4, the transaction data may include information, such as a blockchain address of the sender 430, the digital signature 455, transaction output information 460, and the public key of the sender 415. The transaction data may be sent to the first server 150 from the first client device 125.

The first server 150 may receive the transaction data from the first client device 125. At step 610, the first server 150 may broadcast the transaction to the blockchain network 130a. The transaction may be received by one or more nodes 205 of the blockchain network 130a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. Validating the transaction may include determining whether the transaction is legal or conforms to a pre-defined set of rules for that transaction, establishing user authenticity, and establishing transaction data integrity. At step 625, if the transaction is successfully validated by a node 205, the validated transaction is added to a block being constructed by that node 205 (step 630). As discussed above, since different nodes 205 may choose to validate different transactions, different nodes 205 may build or assemble a block comprising different validated transactions. Thus, the transaction associated with the first user 110 transferring 10 units of cryptocurrency to the second user 115 may be included in some blocks and not others.

At step 635, the blockchain network 130a may wait for a block to be published. Validated transactions may be added to the block being assembled by a node 205 until it reaches a minimum size specified by the blockchain. If the blockchain network 130a utilizes a proof of work consensus model, then the nodes 205 may compete for the right to add their respective blocks to the blockchain by solving a complex mathematical puzzle. The node 205 that solves its puzzle first wins the right to publish its block. As compensation, the winning node may be awarded a transaction fee associated with the transaction (e.g., from the wallet of the first user 110). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining." At step 640, if a block has not been published, then the process 600 returns to step 635 and waits for a block to be published. However, at step 640, if a block has been published, then the process 600 proceeds to step 645.

At step 645, the published block is broadcast to the blockchain network 130a for validation. At step 650, if the block is validated by a majority of the nodes 205, then at step 655, the validated block is added to the blockchain 220. However, at step 650, if the block is not validated by a majority of the nodes 205, then the process 600 proceeds to step 675. At step 675, the block is discarded and the transactions in the discarded block are returned back to the queue. The transactions in the queue may be selected by one or more nodes 205 for the next block. The node 205 that built the discarded block may build a new next block.

At step 660, if the transaction was added to the blockchain 220, the server 150 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and assets from the first user 110 may be transferred to the second user 115. For example, the 10 units of cryptocurrency owned by the first user 110 may be transferred from a financial account of the first user 110 to a financial account of the second user 115 after the transaction receives at least three confirmations.

Smart Contracts

A smart contract is an agreement that is stored in a blockchain and automatically executed when the agreement's predetermined terms and conditions are met. The terms and conditions of the agreement may be visible to other users of the blockchain. When the pre-defined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, the first user 110 (also referred to as tenant 110) may rent an apartment from the second user 115 (also referred to as landlord 115). A smart contract may be utilized between the tenant 110 and the landlord 115 for payment of the rent. The smart contract may indicate that the tenant 110 agrees to pay next month's rent of $1000 by the $28^{th}$ of the current month. The agreement may also indicate that if the tenant 110 pays the rent, then the landlord 115 provides the tenant 110 with an electronic receipt and a digital entry key to the apartment. The agreement may also indicate that if the tenant 110 pays the rent by the $28^{th}$ of the current month, then on the last day of the current month, both the entry key and the rent are released respectively to the tenant 110 and the landlord 115.

Figure 6B:
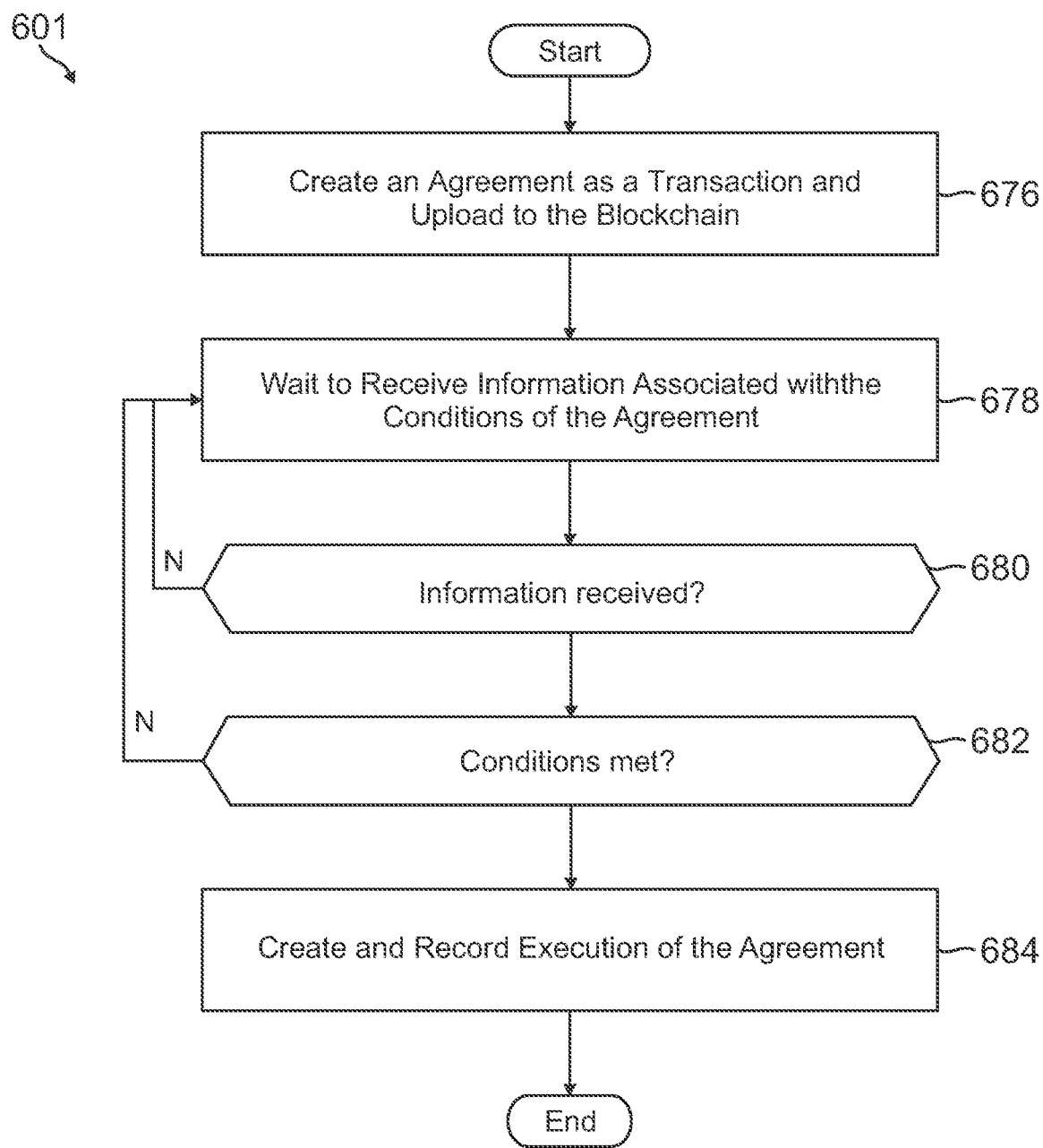
FIG. 6B illustrates a flow diagram showing steps of an example method for performing a blockchain based transaction, according to an embodiment.

FIG. 6B is a flow diagram showing steps of an example method 601 for performing a smart contract transaction between entities, such as the tenant 110 and the landlord 115. The steps of the method 601 may be performed by any of the computing devices shown in FIG. 1. Alternatively or additionally, some or all of the steps of the method 601 may be performed by one or more other computing devices. Steps of the method 601 may be modified, omitted, and/or performed in other orders, and/or other steps added.

At step 676, the agreement or smart contract between the tenant 110 and the landlord 115 may be created and then submitted to the blockchain network 130a as a transaction.

The transaction may be added to a block that is mined by the nodes 205 of the blockchain network 130*a*, the block comprising the transaction may be validated by the blockchain network 130*a* and then recorded in the blockchain 220 (as shown in steps 610-655 in FIG. 6A). The agreement associated with the transaction may be given a unique address for identification.

At step 678, the process 601 waits to receive information regarding the conditions relevant for the agreement. For example, the process 601 may wait to receive notification that $1000 was sent from a blockchain address associated with the tenant 110 and was received at a blockchain address associated with the landlord 115 by the 28$^{th}$ of the current month. At step 680, if such a notification is not received, then the process 601 returns to step 678. However, if at step 680, a notification is received, then the process 601 proceeds to step 682.

At step 682, based on determining that the received notification satisfies the conditions needed to trigger execution of the various terms of the smart contract, the process 601 proceeds to step 684. However, at step 682, if it is determined that the received notification does not satisfy the conditions needed to trigger execution of the smart contract, then the process 601 returns to step 678. At step 684, the process 601 creates and records a transaction associated with execution of the smart contract. For example, the transaction may include information of the payment received, the date the payment was received, an identification of the tenant 110 and an identification of the landlord 115. The transaction may be broadcast to the blockchain network 130*a* and recorded in the blockchain 220 (as shown in steps 610-655 of the process 600 of FIG. 6A). If the transaction is successfully recorded in the blockchain 220, the transaction may be executed. For example, if the payment was received on the 28$^{th}$, then an electronic receipt may be generated and sent to the tenant 110. However, on the last day of the current month, both the digital entry key and the rent are released respectively to the tenant 110 and the landlord 115.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third-party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information or may even go out of business.

Since blockchains are immutable, amending or updating a smart contract that resides in a blockchain may be challenging and thus, more expensive and/or more restrictive than with text-based contracts.

Blockchain Enabled In-Store Purchasing

Figure 8:
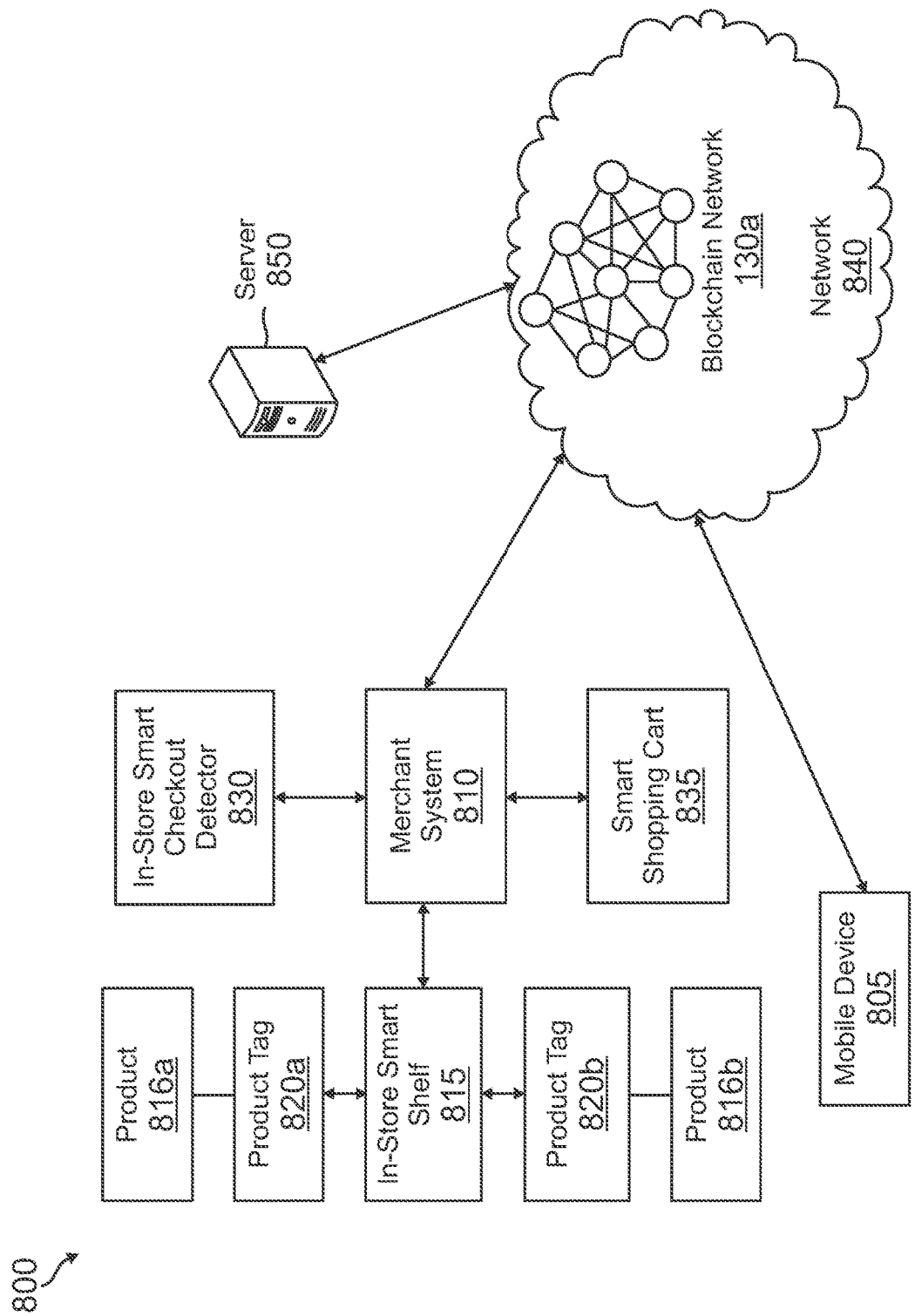
FIG. 8 illustrates a block diagram of a blockchain enabled in-store purchase system, according to an embodiment.

An example of blockchain enabled in-store purchasing is described with reference to the system 800 shown in FIG. 8, the process 600 shown in FIG. 6A and the process 601 shown in FIG. 6B. FIG. 8 illustrates an example of a blockchain enabled in-store purchase system 800. The system 800 includes a mobile device 805, a merchant system 810, and a server 850 connected via a network 840. The merchant system 810 may be connected via a local wireless network to various IoT devices within a store, for example, an in-store smart shelf 815, and an in-store smart checkout detector 830.

The store may include one or more smart shelves, such as the in-store smart shelf 815. The smart shelf 815 may include an RFID tag, an RFID reader, and an antenna. One or more products may be stored on the in-store smart shelf 815. Each product may include an RFID tag, such as a first product tag 820*a* attached to a first product 816*a* and a second product tag 820*b* attached to a second product 816*b*. The in-store smart shelf 815 may, based on reading the product tags 820*a* and 820*b*, send information about the products 816*a* and 816*b* throughout the day to the merchant system 810. The merchant system 810 may in turn update an inventory of products currently within the store.

A shopper may travel through the store with the mobile device 805. A digital shopping list on the mobile device 805 may include a list of items that the shopper may need to purchase. For example, the shopping list may include an item that matches the first product 816*a*. When the shopper is close to the in-store smart shelf 815, the mobile device 805 may notify the shopper that the first product 816*a* is currently available on the in-store smart shelf 815. The shopper may remove the first product 816*a* from the in-store smart shelf 815 and place it into a smart shopping cart 835. The smart shopping cart 835 may read the first product tag 820*a* as well as the product tags attached to other products that may have been placed in the smart shopping cart 835. When the shopper is ready to checkout, the shopper may walk out of the store with the shopping cart 835. As the shopper walks out of the store, the in-store smart checkout detector 830 may detect the smart shopping cart 835. The smart shopping cart 835 may communicate with the in-store smart checkout detector 830 and transmit information about the products in the smart shopping cart. The in-store smart checkout detector 830 may send information about the products, such as the first product 816*a*, and payment information from the mobile device 805 to the merchant system 810. The merchant system 810 may receive information from the in-store smart checkout detector 830 and the payment information and proceed to initiate purchase of the first product 816*a*.

Referring to step 605 of the process 600 shown in FIG. 6A, a wallet application on the mobile device 805 may generate transaction data for transferring an amount of cryptocurrency matching the sale price of the first product 816*a* from the shopper to the merchant. The wallet application may generate a public key for the transaction using the private key of the shopper. In order to indicate that the shopper is the originator of the transaction, a digital signature may also be generated for the transaction using the private key of the shopper. The transaction data may be sent to the server 850 from the mobile device 805.

The server 850 may receive the transaction data from the mobile device 805. At step 610, the server 850 may broadcast the transaction to the blockchain network 130*a*. The transaction may be received by one or more nodes 205 of the blockchain network 130a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. At step 625, if the transaction is successfully validated by a node 205, the validated transaction is added, at step 630, to a block being constructed by that node 205. At step 635, the blockchain network 130a may wait for a block to be published. At step 640, if a block has not been published, then the process 600 returns to step 635 and waits for a block to be published. However, at step 640, if a block has been published, then the process 600 proceeds to step 645.

At step 645, the published block is broadcast to the blockchain network 130a for validation. At step 650, if the block is validated by a majority of the nodes 205, then at step 655, the validated block is added to the blockchain 220. At step 660, if the transaction was added to the blockchain 220, the server 850 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and the sale price of the first product 816a may be transferred from the shopper to the merchant.

When the in-store smart checkout detector 830 sends information about the products, such as the first product 816a, and payment information from the mobile device 805 to the merchant system 810, a smart contract may be created between the shopper and the merchant and executed according to the process 601 shown in FIG. 6B. For example, at step 676, a smart contract between the shopper and the merchant may be created and then submitted to the blockchain network 130a as a transaction. For example, at step 678, the process 601 may wait to receive notification that an amount of cryptocurrency equal to the sale price of the first product 816a was sent from a blockchain address associated with the shopper and was received at a blockchain address associated with the merchant by the time the first product 816a is removed from the smart shopping cart 835. If the payment for the first product 816a was successfully transferred from the shopper to the merchant by the time the shopper removes the first product 816a from the smart shopping cart 835, then an electronic receipt may be generated and sent to the shopper. Otherwise, the merchant system 815 may be alerted that the shopper is attempting to leave the premises without paying for the first product 816a.

Blockchain Enabled In-vehicle Purchasing

Figure 9:
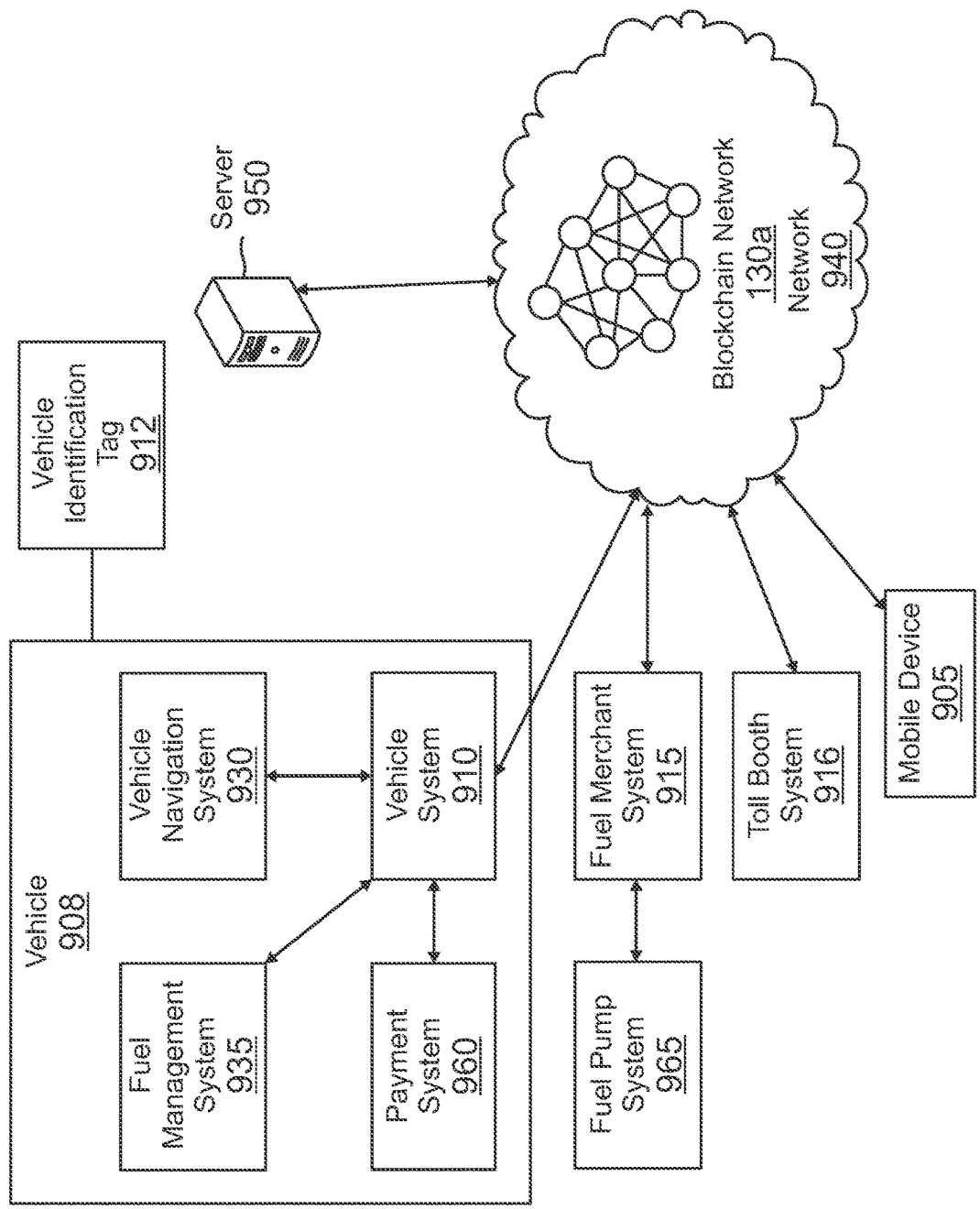
FIG. 9 illustrates a block diagram of a blockchain enabled in-vehicle purchase system, according to an embodiment.

An example of blockchain enabled in-vehicle purchasing is described with reference to the system 900 shown in FIG. 9, the process 600 shown in FIG. 6A and the process 601 shown in FIG. 6B. FIG. 9 illustrates an example system 900 for blockchain enabled in-vehicle purchasing. The system 900 includes an IoT enable smart vehicle 908. The vehicle 908 may include one or more computing devices implementing a vehicle system 910, a vehicle navigation system 930, a payment system 960 and a fuel management system 935. The vehicle 908 may include a RFID tag, such as a vehicle identification tag 912. The system 900 may also include various merchant systems, such as a fuel merchant system 915, and a toll booth system 916. The system 900 may also include a mobile device 905 belonging to a driver of the vehicle 908.

When the driver gets into the vehicle 908, payment information may be loaded from the driver's mobile device 905 into the vehicle payment system 910 so it is available for secure payments to other devices in order to complete in-vehicle purchases, such as in-vehicle purchase of fuel and in-vehicle payment of tolls. The driver of the smart vehicle may pay for parking, fast food, using the IoT enabled smart vehicle 908. Additionally, the IoT enabled smart vehicle 908 may also facilitate in-vehicle purchasing of smartphone apps, music, audio books, and other goods and services.

The fuel management system 935 may perform various functions related to fuel usage and communicate with the vehicle system 916. For example, the fuel management system 935 may monitor fuel usage and based on detecting that the fuel is below a threshold, notify the vehicle system 910. The vehicle system 910 may communicate with the vehicle navigation system 930 to determine nearby fuel stations. The selection of a fuel station to may be based on various factors, such as the availability of fuel at nearby fuel stations, the vehicle's current route and location, incentives that may be offered by nearby fuel stations, etc. The vehicle system 910 may notify the driver about the selection of a fuel station and the vehicle 908 may be re-routed to the selected fuel station. Upon arriving at the selected fuel station, the driver may pull up to a fuel pump. The fuel pump may include a fuel pump system 965 configured to detect the RFID tags of vehicles, such as the vehicle identification tag 912 in order to obtain an identification of the vehicles. The fuel pump system 965 and the payment system 960 may be configured to communicate with each other. The fuel payment system 960 may send payment information to the fuel pump system 965. After the driver has completed re-fueling, the driver may simply drive away. The fuel pump system 965 may send the fuel merchant system 915 information about the identification of the vehicle 908, the amount of fuel purchased, and the payment information. The fuel merchant system 915 may use the information to complete a transaction with the driver for the purchase of the fuel. For example, the fuel merchant system 915 may communicate with the server 950 to charge the driver for the fuel according to the process 600 shown in FIG. 6A. Additionally, the fuel merchant system 915 may communicate with the server 950 in order to create a smart contract between the driver and the fuel merchant. The smart contract may be created and executed according to the process 601 shown in FIG. 6B.

Augmented Reality (AR), Mixed Reality and Blockchain Based E-Commerce

AR or mixed reality enabled devices, such as wearable smart glasses, head mounted devices, holographic devices, or smartphone applications overlay digital content on top of a real world view, thus, enhancing a user's experience of the real world. The overlay content may be 3D models generated based on 3D scanning real world objects. AR enables users to experience online shopping in a virtual environment. For example, using AR, browse virtual stores and view 3D models of items for sale in virtual stores. Just as in the real world, customers may be able to handle and examine various physical details of the products. Blockchain smart contracts may be utilized to provide an e-commerce platform where customers may purchase items from online merchants with cryptocurrency and digital wallets. Information about a product, such as country of origin, materials, ingredients, price, description, measurements, terms and conditions, 3D model of the physical product, etc., may be hashed and recorded in a blockchain. This provides proof of ownership of virtual goods and products and enables accurate tracking of any changes made to this information. Artificial intelligence (AI) may be utilized for generating 3D models of products based on 2D images of the products. Smart contracts may be utilized to conduct transactions between merchants and customers.

As an example, a customer may shop for clothing by browsing different stores in a virtual shopping mall via a wearable AR device, such as a pair of smart glasses. The customer may examine a 3D model of a shirt as he or she would in the real world. Additionally, the customer may virtually try on the shirt using a 3D model of the customer's body. If the customer decides to purchase the shirt, the customer may initiate a transaction with the merchant of the store. A transaction may be submitted to the blockchain via the customer's digital wallet to transfer money (cryptocurrency) from the customer to the merchant. Various smart contracts may be utilized to implement various aspects of the e-commerce process. For example, based on detecting that the sale price of the shirt has been successfully transferred from the customer to the merchant, a smart contract may be executed to initiate shipment of the shirt from the merchant's warehouse to the customer. As described above with reference to supply chain monitoring and tracking, RFID tags and other IoT devices may be utilized to track the shipment of the shirt from the merchant's warehouse to the delivery of the shirt to the customer's residence.

Quantum Computing

One of the concerns of quantum computing is that it may increase the probability of breaking cryptographic algorithms and thus, weaken overall security for the blockchain. This may be addressed by requiring larger key sizes for blockchain asymmetric-key pairs of cryptographic algorithms. In some cases, if there is a concern that a block may be decrypted in the future, a dynamically changing cryptographic hash may be utilized. A different cryptographic hash may be dynamically selected for a particular block or the entire blockchain based on various factors, such as whether there is a concern that the block will be decrypted in the future, increasing a strength of the hash, utilizing a hash that is better suited for protecting privacy. In some cases, different cryptographic hashes may be selected for different blocks.

Anonymity and Privacy

As discussed above, the use of a private/public key pair to establish user authenticity during validation of a blockchain transaction provides some privacy as it does not reveal user identity. However, the transactions stored on a blockchain may be visible to the public. It has been shown that user identity may be derived from the publicly available transaction information.

Blockchain Size

Depending on a frequency at which events are recorded in a blockchain, the size of the blockchain may grow quickly. Computing/storage capacity (i.e., faster processors, larger storage components) may be needed to support the expansion of the blockchain. In some cases, blocks may be compressed prior to being added to the chain. In some cases, blocks may be eliminated, for example, at the beginning of the blockchain, when they become stale or irrelevant. As an example, a method for "replacing" the first 1000 transactions with a new block that effectively mimics the hash of the 1000 transactions may be useful for managing blockchain size.

Blockchain Immutability

In some cases, content in a blockchain may need to be deleted. For example, content may need to be deleted if there is a security breach or if the content is no longer relevant. A level of immutability of a blockchain may depend on a type of the blockchain. For example, changing content may be difficult in a public blockchain due to its possible impact on a large number of users. According to some techniques, data stored in a private blockchain, or a public blockchain controlled by a few entities may be changed by recording a flag (current block) where the change is being made, and adding the current block (referred to by the flag) to the blockchain. The added block may then indicate the change made to the previous block.

As another example, a blockchain may need to be changed to resolve a broken link. For example, the hash of a changed block may no longer match the hash stored in the block+1. In some cases, the blockchain may need to be changed in order to reverse the results of illegal transactions. In some cases, the blockchain may need to be changed to address software errors, erroneous transactions, or remove information that is confidential or required by law to be removed. If the blockchain is immutable, these errors and information may be permanently embedded in the blockchain. Additionally, the blockchain may need to be changed to comply with regulatory concerns, such as the European Union's incoming General Data Protection Regulation (GDPR), or California Consumer Privacy Act (CCPA), regarding consumer data privacy and ownership rights, US Fair Credit Reporting Act, and the SEC's "Regulation SP," which require that recorded user identifiable personal financial data be redactable.

Some techniques may allow modifications to the blockchain to address software errors, legal and regulatory requirements, etc., by allowing designated authorities to edit, rewrite or remove previous blocks of information without breaking the blockchain. Such techniques may enable blockchain editing by using a variation of a "chameleon" hash function, through the use of secure private keys. This editing may allow smart contracts that were flawed at issue to be updated so that the changes carry over to subsequent smart contracts in the blockchain. Using these techniques, blocks that have been changed may be using a "scar" or mark that cannot be removed, even by trusted parties.

According to some techniques, when a block is hashed, any confidential information, such as personally identifiable information, and IP addresses, is not included in the hash because it is not part of the data values that were hashed. But because there is no hash of the confidential information, it may be changed. According to some techniques, the confidential information may not be placed or recorded into the blockchain. Rather the information may reside in a file that is external to the blockchain. A hash of that file, however, may be recorded in the blockchain. For example, a user's confidential information may be deleted locally without affecting the blockchain.

As another example, assuming that all content included in a block in a blockchain cannot be changed after a block is added to the blockchain, a determination may be made before adding data to the blockchain of whether some or all of that data may need to be deleted at a later time. For example, confidential information (i.e., data to be deleted at a later time) may be stored as a file that is external to the block and the blockchain. For the purposes of creating the block, a link to the file containing the confidential information and a hash of the file containing the confidential information file may be added to the block. An example of a link would be an HTTP link. During confirmation of the block that is to be added to the blockchain, the network nodes may be able to access the confidential information and verify that the confidential information based on the hash value of the file in the block. Because the hash value of the file is a part of the block, the file containing the confidential information may not be easily changed. However, it may be possible to change the confidential information file by changing the data therein and adding a nonce. This may seek to change the nonce until the resulting hash equals the hash that is stored in the blockchain. However, this would be difficult (probably near impossible), and an inspection of the modified confidential information file would reveal the added nonce, which may then raise suspicion that information was changed since it was first added to the blockchain.

Files containing confidential information may be encrypted (e.g., through an asymmetric key encryption function) prior to the hashing operation. When "deleting" the confidential information, the file containing the confidential information may be deleted or removed resulting in the link, which is stored in the blockchain, being ineffective for retrieving the file. The hash of the file, and the link, remain in the blockchain so that the linking of the blocks through hash functions is not affected. However, because of this change, a transaction that is part of the block or part of a different special block could be added to the blockchain to indicate that the link is no longer effective and the confidential information file is no longer part of the blockchain. This may effectively keep confidential information out of the blockchain while providing the confidential information to users of the blockchain and proof of authenticity of the confidential information before it is deleted from the blockchain. This may come with drawbacks because access to data implies that such data may be stored. Accordingly, those with access to the confidential information file, while it was part of the blockchain, may have stored that information in another location that may no longer be reachable during the "deleting" operation discussed above.

51% Attack

A "51% attack" refers to an individual mining node or a group of mining nodes controlling more than 50% of a blockchain network's mining power, also known as hash rate or hash power. The hash rate is a measure of the rate at which hashes are being computed on the blockchain network. As described above, hashing may include taking an input string of a given length, and running it through a cryptographic hash function in order to produce an output of a fixed length. A blockchain network's hash rate may be expressed in terms of 1 KH/s (kilohash per second) which is 1,000 hashes per second, 1 MH/s (megahash per second) which is 1,000,000 hashes per second, 1 TH/s (terahash per second) which is 1,000,000,000,000 hashes per second, or 1 PH/s (petahash per second) which is 1,000,000,000,000,000 hashes per second. As an example, a mining node in a blockchain utilizing a proof of work consensus model (PoW) may perform hashing in order to find a solution to a difficult mathematical problem. The hash rate of the mining node may depend on the computational resources available to that node. A mining node that successfully solves the mathematical problem may be able to add a block to the blockchain. Thus, by ensuring that invalid transactions cannot be included in a block, mining nodes increase the reliability of the network. Transactions may be deemed invalid if they attempt to spend more money than is currently owned or engage in double spending. If a mining node intentionally or unintentionally includes an invalid transaction in a block, then the block will not be validated by the network. Additionally, nodes that accept the invalid block as valid and proceed to add blocks on top of the invalid block will also end up wasting computational resources. Thus, mining nodes are discouraged from cheating by intentionally adding invalid transactions to blocks and accepting invalid blocks as valid.

Figure 7A:
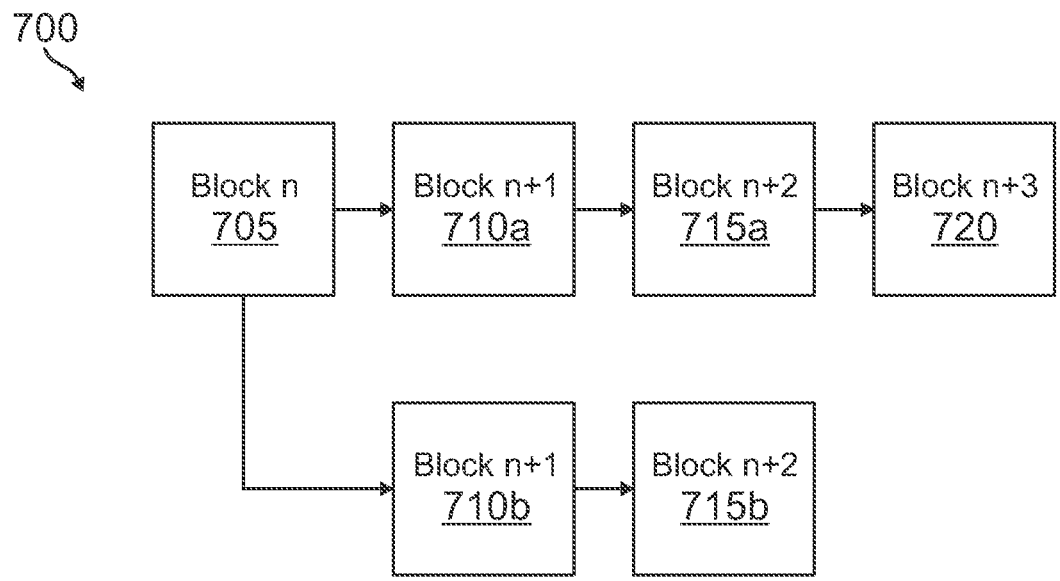
FIG. 7A illustrates an example of a privately broadcasted blockchain, according to an embodiment

An entity may be able to disrupt the network by gaining control of 50% of a network's hash rate. In a 51% attack, a blockchain node may intentionally reverse or overwrite transactions and engage in double spending. When a node generates a valid block of transactions, it broadcasts the block to the network for validation. In some cases, a node controlling more than 50% of a network's hash rate may mine blocks in private without broadcasting them to the network. In such a scenario, the rest of the network may follow a public version of the blockchain while the controlling node may be following its private version of the blockchain. FIG. 7A shows a fraudulent and valid version of a blockchain 700. The valid blockchain on the top comprises the valid blocks 705, 710*a*, 715*a*, and 720. The fraudulent blockchain on the bottom is not broadcast to the network and includes the blocks 705, 710*b*, 715*b*, and an invalid block 720.

Figure 7B:
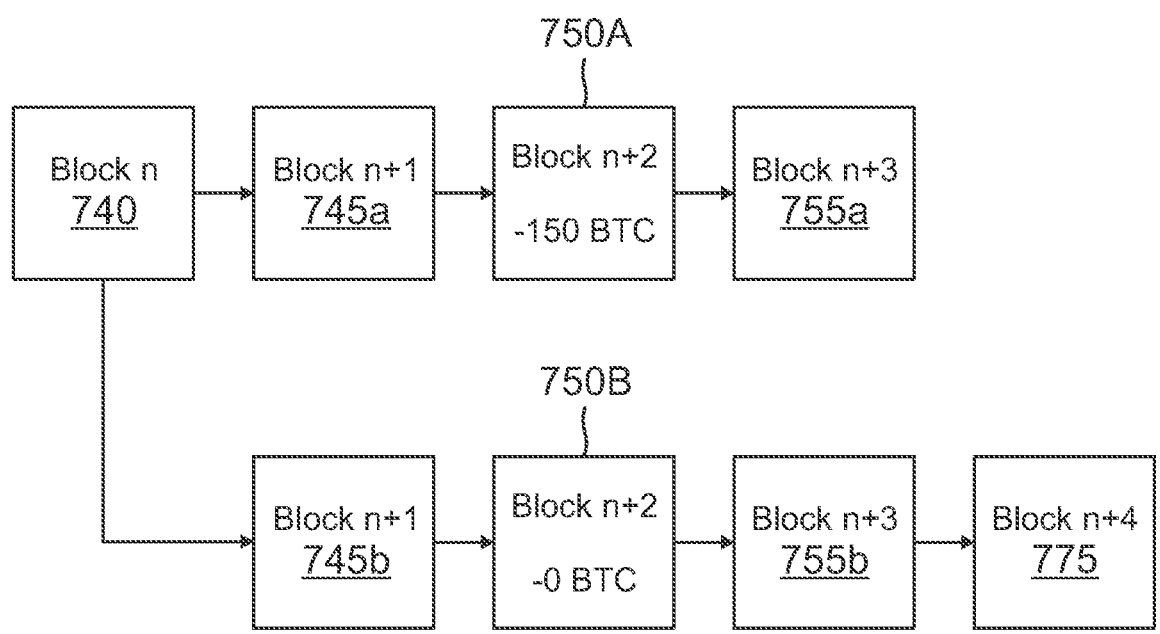
FIG. 7B illustrates an example of blockchain misuse, according to an embodiment.

FIG. 7B shows another fraudulent and valid version of a blockchain. The valid version of the blockchain includes nodes 740, 745*a*, 750*a*, and 755*a*. The fraudulent version of the blockchain includes nodes 740, 745*b*, 750*b*, 755*b*, and 775. However, following the longest chain rule, the network may select and utilize the private or fraudulent blockchain comprising nodes 740, 745*b*, 750*b*, 755*b* and 775. Since it is the longest chain, previous transactions may be updated according to this chain. The cheating node may include transactions that spend money, such as the block 750*b* including the transaction for 150 BTC, on the public or fraudulent version of the blockchain without including these transactions in the private version of the blockchain. Thus, in the private version of the blockchain, the cheating node may continue to own the spent 150 BTC. When the cheating node controls more than 50% of the hashing resources of the network, it may be able to broadcast its private version of the blockchain and continue to create blocks on the private blockchain faster than the rest of the network, thus, resulting in a longer blockchain. Since there are two versions of the blockchain, the network may select the longest or fraudulent private blockchain as the valid blockchain. As a result, the rest of the network may be forced to use the longer blockchain. The public or valid version of the blockchain may then be discarded or abandoned and all transactions in this blockchain that are not also in the private or fraudulent version of the blockchain may be reversed. The controlling or cheating node may continue to own the spent money because the spending transactions are not included on the fraudulent version of the blockchain, and the cheating node may therefore, spend that money in future transactions.

Because of the financial resources needed to obtain more hashing power than the rest of the entire network combined, a successful 51% attack may generally be challenging to achieve. However, it would be less expensive to achieve a 51% attack on a network with a lower hash rate than one with a higher hash rate. Additionally, the probability of a successful 51% attack increases with the use of mining pools in which multiple nodes may combine their computational resources, for example, when mining is performed from the same mining pool.

Description of the Invention

Figure 10:
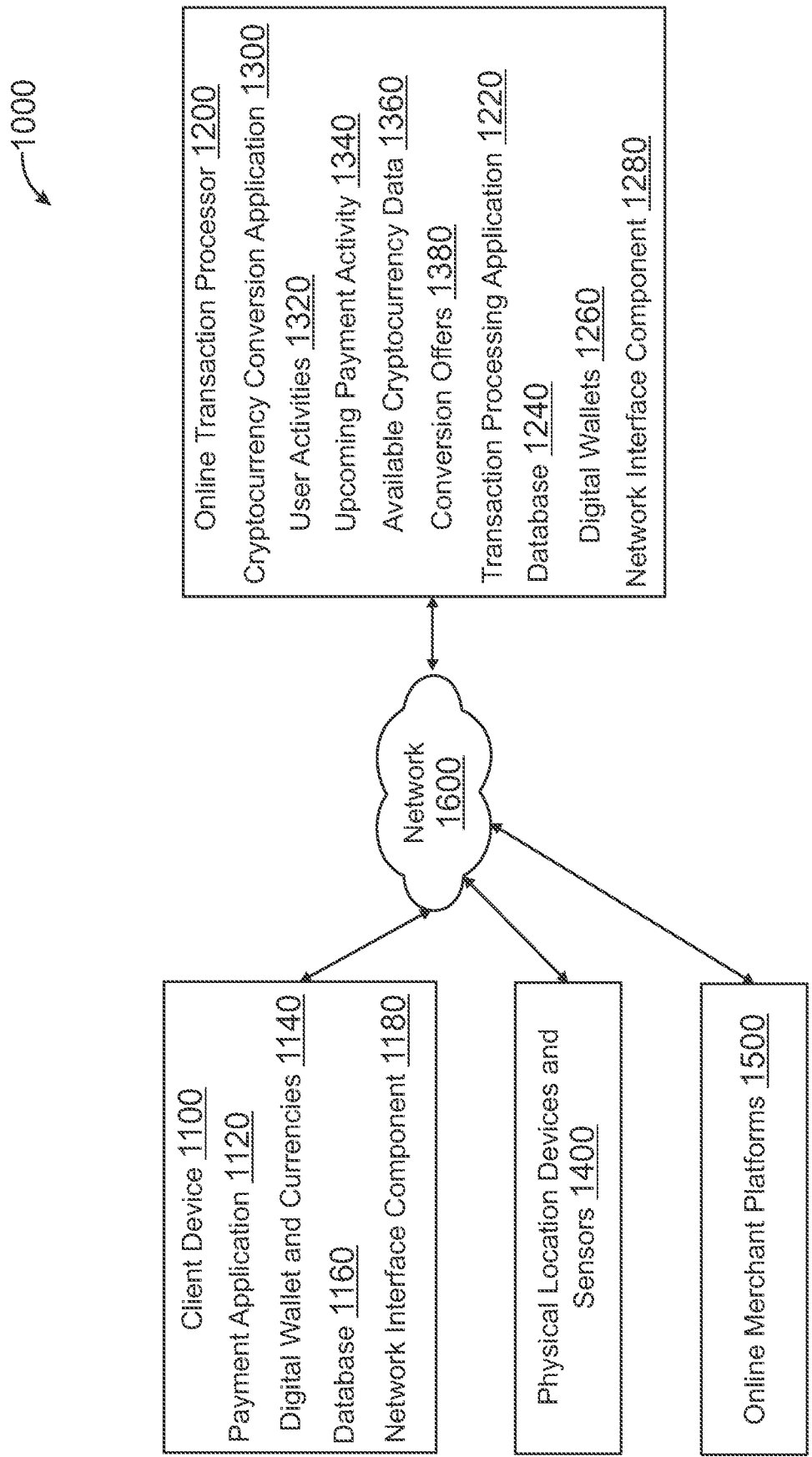
FIG. 10 illustrates a block diagram of a networked system suitable for implementing the processes described herein, according to an embodiment.

FIG. 10 is a block diagram of a networked system 1000 suitable for implementing the processes described herein, according to an embodiment. As shown, system 1000 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 1000 includes a client device 1100, an online transaction processor 1200, physical location devices and sensors 1400, and online merchant platforms 1500 in communication over a network 1600. Client device 1100 may be used to process payments, such as through a payment platform, application, and/or application extension, which may be facilitated through digital accounts and wallets that allow for cryptocurrency conversion or sale in order to obtain an amount of funds in another currency or another type of cryptocurrency to process transactions using online transaction processor 1200. During cryptocurrency exchange transaction processing, physical location devices and sensors 1400 and/or online merchant platforms 1500 may be used to determine whether client device 1100 may engage in electronic transaction processing, and thereafter provide a notification having user interface elements that enable converting or selling of a specific type of cryptocurrency to obtain funds in another currency.

Client device 1100, online transaction processor 1200, physical location devices and sensors 1400, and online merchant platforms 1500 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 1000, and/or accessible over network 1600.

Client device 1100 may be implemented using any appropriate hardware and software configured for wired and/or wireless communication with online transaction processor 1200, physical location devices and sensors 1400, and/or online merchant platforms 1500 for processing payments and transactions including use, conversion, and/or sale of cryptocurrency to engage in electronic transaction processing using another currency, which as referred herein includes conventional currency or another type of cryptocurrency. Client device 1100 may correspond to an individual user, consumer, or merchant that utilizes a payment network and platform provided by online transaction processor 1200 to process those transactions. In various embodiments, client device 1100 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing devices may function similarly.

Client device 1100 of FIG. 1 contains a payment application 1120, a database 116, and a network interface component 118. Payment application 1120 may correspond to executable processes, procedures, and/or applications with associated hardware. In other embodiments, client device 1100 may include additional or different software as required.

Payment application 1120 may correspond to one or more processes to execute modules and associated devices of client device 1100 to provide a convenient interface to permit a user of client device 1100 to enter, view, and/or process transactions, such as by using a digital wallet and currencies 1140. In this regard, payment application 1120 may correspond to specialized hardware and/or software utilized by client device 1100 that may provide transaction processing using an amount of funds in a currency, where that amount of funds may be obtained from an exchange or sale of cryptocurrency available to the user from digital wallet and currencies 1140. In some embodiments, the transaction may be to request a payment to another user in a currency, such as a seller, when a buyer provides the amount of funds in another currency. Exchange, conversion, and/or sale of cryptocurrency and electronic transaction processing in a currency may be done through a user interface enabling the user to enter and/or view an amount of funds, the requested cryptocurrency exchange rates, amount of time, and other conditions for processing cryptocurrency sales or exchanges, and the like. This may be based on a transaction generated by payment application 1120 using a merchant website and/or when engaging in transaction processing at a physical merchant location. For example, a transaction may be generated, initiated, and/or detected by online transaction processor 120, or electronic transaction processing may be predicted as likely to be engaged in using client device 110 by online transaction processor 120. Payment application 1120 may also be used to receive a receipt or other information based on transaction processing.

In this regard, payment application 1120 may be used to receive an offer for the conversion and/or sale of an amount of cryptocurrency available from digital wallet and currencies 1140 to another currency that may be used to process the transaction. The offer may be in response to predicting that a user associated with client device 110 will engage in electronic transaction processor. For example, physical location devices and sensors 1400 and/or online merchant platforms 1500 may be used to detect user activities, interaction, and the like that indicates that currency may be needed to complete the electronic transaction processing. Thereafter, a notification may be provided to the user via payment application 1120, which may include a link, selectable button or icon, executable operation, and/or user interface element that allows for the user to accept the offer and obtain the amount of currency from the conversion or sale of the amount of cryptocurrency. Digital wallet and currencies 1140 may be used to provide the amount of cryptocurrency and/or provide access to the cryptocurrency on one or more platforms, as well as receive and/or access an account that has the amount of the currency obtained from the conversion or sale of the cryptocurrency. In various embodiments, payment application 1120 may correspond to a general browser application configured to retrieve, present, and communicate information over the Internet (e.g., utilize resources on the World Wide Web) or a private network. For example, payment application 1120 may provide a web browser, which may send and receive information over network 1600, including retrieving website information, presenting the website information to the user, and/or communicating information to the website, including payment information for the transaction. However, in other embodiments, payment application 1120 may include a dedicated application of online transaction processor 1200 or other entity (e.g., a merchant), which may be configured to assist in processing transactions, such as a mobile application on a mobile device.

Client device 1100 may further include database 116 which may include, for example, identifiers such as operating system registry entries, cookies associated with payment application 1120 and/or other applications, identifiers associated with hardware of client device 1100, or other appropriate identifiers. Identifiers in database 116 may be used by a payment/service provider to associate client device 1100 with a particular account maintained by the payment/service provider. Database 116 may also further store received transaction data and/or data for transactions and/or user activities indicating whether a user may engage in electronic transaction processing.

Client device 1100 includes at least one network interface component 118 adapted to communicate with distributed network participants 120 and/or online transaction processor 1200 over network 1600. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Online transaction processor 1200 may be maintained, for example, by an online service provider, which may provide operations for exchanging currencies from one type to another for an amount of funds including exchanging, converting, and/or selling cryptocurrency. In such embodiments, online transaction processor 1200 may interface with the layer one and layer two networks for cryptocurrency blockchains and/or cryptocurrency exchange platforms in order to enable the conversion or sale of cryptocurrency to obtain an amount of funds in another currency for electronic transaction processing. Online transaction processor 1200 includes one or more processing applications which may be configured to interact with client device 1100 for cryptocurrency exchange transactions and payments. In one example, online transaction processor 1200 may be provided by PAYPAL®, Inc. of San Jose, CA, USA. However, in other embodiments, online transaction processor 1200 may be maintained by or include another type of service provider.

Online transaction processor 1200 of FIG. 1 includes a cryptocurrency conversion application 1300, a transaction processing application 1220, a database 1240, and a network interface component 1280. Cryptocurrency conversion application 1300 and/or transaction processing application 1220 may correspond to executable processes, procedures, and/or applications with associated hardware. In other embodiments, online transaction processor 1200 may include additional or different modules having specialized hardware and/or software as required.

Cryptocurrency conversion application 1300 may correspond to one or more processes to execute software using associated hardware components of online transaction processor 1200 to predict whether a user will engage in electronic transaction processing at a physical merchant location and/or with a digital merchant (e.g., via a merchant website or application). In some embodiments, cryptocurrency conversion application 1300 may first be used to predict whether a user will engage in electronic transaction processing based on user activities 1320. In response to that prediction, cryptocurrency conversion application 1300 may provide one or more of conversion offers 1380 that has a locked rate or price for conversion or sale of cryptocurrency in another currency. If accepted, cryptocurrency conversion application 1300 may then facilitate obtaining an amount of funds in the other currency using an amount of the selected cryptocurrency from a digital wallet and/or cryptocurrency exchange platform.

In this regard, initially, cryptocurrency conversion application 1300 may receive, detect, and/or aggregate user activities 1320, which may correspond to one or more activities engaged in by a user with a merchant and/or one or more other items or users. For example, user activities 1320 may correspond to real-world activities of a user that may be detected by physical location devices and sensors 1400. This may include those activities associated with browsing and/or shopping for items, such as by picking up items, requesting services, ordering items or services, reviewing available items, adding items to a shopping cart or placing in a receptacle for purchase, and the like. Further, other user activities may include reviewing digital shopping lists, messaging other users about available purchases and items, speaking with a merchant, and the like. Further, the real-world activities may include locations of the user and/or actions of the user, such as by walking into a merchant location, approaching or standing in a checkout or ordering aisle or lane, and the like. Similarly, digital user activities of user activities 1320 may include those user activities that are performed on a merchant website or within a merchant shopping or purchasing application associated with online merchant platforms 1500. These may include browsing items, searching for items (e.g., via one or more search inputs), and/or requesting information about items for purchase. Other digital activities may include adding items to digital shopping carts, viewing advertisements or marketing and/or responding to that marketing, entering a transaction processing or checkout flow via a website or application, entering financial, billing, and/or shipping information, and the like.

Thereafter, cryptocurrency conversion application 1300 may process user activities 1300 in order to determine whether those user activities meet or exceed a threshold for predicting that a user will engage in electronic transaction processing. Scoring of user activities 1300 for a user may be performed using a rule-based and/or ML model-based engine and system that may score user activities 1320 and compare that score to a threshold. If predicted as potentially engaging in electronic transaction processing, then cryptocurrency conversion application 1300 may determine upcoming payment activity 1340 that is associated with a transaction that the user is predicted to process. For example, upcoming payment activity 1340 may include a transaction or payment total, as well as parameters for payment of the total. Upcoming payment activity 1340 may also include acceptable currencies by the merchant or other user for the transaction and any additional fees or costs. The merchant or other user may accept fiat, cryptocurrencies, and/or virtual currencies, and may also impose tax, shipping fees, transaction processing fees, and the like for payment processing. The amount due may therefore correspond to an amount of a currency required for processing the transaction.

In order to obtain the amount of funds in the currency requested or required for the transaction, cryptocurrency conversion application 1300 may then predict a cryptocurrency that the user may want to sell or convert into the other currency for the transaction, including any types of cryptocurrency the user may not have available, but could then purchase to fund the transaction, such as having available funds in funding sources or the digital wallet of the user than can be used to purchase other forms or types of cryptocurrency. For example, cryptocurrency conversion application 1300 may access and/or determine available cryptocurrency data 1360, which may include cryptocurrency data for available cryptocurrency assets for one or more users, as well as cryptocurrency pricing and/or exchange rate data and trends. Available cryptocurrency data 1360 for specific users may correspond to data associated with cryptocurrency assets for each user, which may correspond to cryptocurrency available in a cold digital wallet, online account or digital wallet for a user, and/or with a cryptocurrency exchange platform. The cryptocurrency for a user may correspond to those assets owned or controlled by the user. Further, available cryptocurrency data 1360 may include information about pricing, exchange rates, and/or trends in price/rate over time (e.g., a moving average, percentage change, etc.), which may be used to predict an average price or rate over a time period, predict a future price or rate, and/or offer a predictive price or rate to a user. In some embodiments, more than one cryptocurrency may be selected for a sale or conversion offer to a user, and thus, available cryptocurrency data 1360 may be associated with multiple cryptocurrencies.

For example, when locking a price or rate for a cryptocurrency that is to be offered for conversion offers 1380, cryptocurrency conversion application 1300 may utilize available cryptocurrency data 1360 to predict and/or set the price or rate for the cryptocurrency that is offered to the user for a time period, which may be independent of actual changes to the cryptocurrencies price on an open market and/or with a cryptocurrency exchange platform. This rate or price may be locked so that it is stable for the time period or may be continually monitored and adjusted during the time period. Further, the rate or price may be voided if a trigger condition, change in rate or price, and/or change in availability of cryptocurrency caused the offered rate to violate a policy. When setting the rate or price, the value may be predicted as a potential value over the time period and may also be set to comply with a cryptocurrency sale or conversion policy that attempts to achieve a net zero balancing when selling cryptocurrency and/or converting cryptocurrency on behalf of users. Thus, cryptocurrency conversion application 1300 may lock the rate or price by establishing for the user for the time period and making available for that time period. This may also include taking the input amount of funds in the cryptocurrency and the desired amount of funds in the other selected currency (e.g., fiat, another cryptocurrency, or a virtual currency) and placing both amounts into a hash-based locking digital mechanism that is locked by an encryption key by both parties (e.g., the buyer and seller of the cryptocurrency). The opposite key may be required to unlock the hash-based locking digital mechanism to recover the exchanged amount of funds. In this regard, if the sale or conversion of the cryptocurrency is approved, the keys are exchanged in order for each party to obtain their currency from the sale or conversion. However, if the time limit expires or the offer is declined, each party may receive back their initial input amount of funds in their original currency type.

Cryptocurrency conversion application 1300 may then generate conversion offers 1380 that include the offer for the sale or conversion of the selected cryptocurrency in order for the user to process the transaction. In this regard, conversion offers 1380 may including data for the locked conversion rate and/or sale price, as well as an amount of time that the user has to accept the offer (e.g., to sell or convert cryptocurrency so that another amount of funds in a currency may be obtained). This amount of time may be set based on a predicted amount of time until the user engages in electronic transaction processing and expected amount of time that the cryptocurrency price or rate may remain stable and/or similar to the offered price or rate, and/or based on one or more policies including attempting to remain at a net zero balance. Further, a user interface element, menu option, link, and/or executable process may be provided in or with conversion offers 1380, which may enable the user to request the sale or conversion of the amount of cryptocurrency. To facilitate sales or conversions of cryptocurrencies, a cryptocurrency exchange platform and/or transaction processing application 1220 may be used. Further, after obtaining of the currency to be used for the transaction the user is engaging in and/or processing, cryptocurrency conversion application 1300 may provide the currency to an account or digital wallet of the user. In some embodiments, cryptocurrency conversion application 1300 may interface with (e.g., via one or more API calls and/or requests), in order to facilitate automatic transaction processing and/or payment using the amount of funds received in the currency for the transaction based on the sale or conversion of the user's cryptocurrency.

Transaction processing application 1220 may correspond to one or more processes to execute software using associated hardware components of online transaction processor 1200 to process a transaction and/or exchange of an amount of funds from one currency to another currency. In some embodiments, transaction processing application 1220 may be used by a user associated with client device 1100 to establish a payment account and/or digital wallet, which may be used to process transactions and/or sell cryptocurrency. In various embodiments, an amount of funds in one or more currencies may be established for the account. A digital token for the wallet may be used to send and process payments, for example, through an interface provided by online transaction processor 1200. The digital wallet may be accessed and/or used through a browser application/extension and/or dedicated payment application executed by client device 1100 and engage in electronic transaction processing, such as using cryptocurrency and/or through an amount of currency obtained from a sale of cryptocurrency. In various embodiments, transaction processing application 1220 may be used to access digital wallets 1240 for use in processing transactions. In this regard, client device 1100 may establish one or more of transactions, which may be performed online or at physical merchant locations. In other embodiments, one or more transactions may correspond to checkout or payment requests where an amount of funds is to be paid to a seller, merchant, or other entity by a buyer, consumer, or similar entity using an amount of funds obtained from a sale or conversion of cryptocurrency. In this regard, transaction processing application 1222 may interface with cryptocurrency conversion application 1300 when obtaining funds in another currency in order to process the transaction.

Additionally, online transaction processor 1200 includes database 136. Database 136 may store various identifiers associated with client device 1100. Database 1240 may also store account data, including payment instruments and authentication credentials, as well as transaction processing histories and data for processed transactions. Digital wallets

1260 stored by database 1240 may include data for accounts used for transaction processing including sales or conversions of cryptocurrency.

In various embodiments, online transaction processor 1200 includes at least one network interface component 1280 adapted to communicate client device 1100, physical location devices and sensors 1400, online merchant platforms 1500, and/or another device/server for a merchant over network 1600. In various embodiments, network interface component 1280 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Physical location devices and sensors 1400 may correspond to those devices and sensors at a physical location, such as a merchant storefront, retail location, and the like. For example, physical location devices and sensors 1400 may correspond to a wireless transceiver configured to broadcast a short-range wireless signal over a proximity range at the physical merchant location, a geo-location transceiver for the user, a mobile device of the user, a microphone, a camera, a biometric detector, a movement detector, or an Internet of Things sensor. These may be placed and/or used at or near products, services, or other items for sale, as well as at or nearby payment, ordering, and/or checkout locations. Physical location devices and sensors 1400 may be used to determine user activities 1320 for real-world activities engaged in by users at merchant locations and determine whether a user is engaging in electronic transaction processing.

Physical location devices and sensors 1400 may also correspond to edge networks that collect and/or provide data for users at or nearby certain locations or areas. For example, an online service provider, such as an online platform providing one or more services to users and groups of users, may provide a platform that allows a user to utilize one or more edge computing systems and edge computing storage nodes for location and activity-specific data and operations. An edge computing system may correspond to an auxiliary cloud computing system that may provide one or more edge computing nodes that are location-specific and provided on a network closer to the location so that data may be served faster and with lower latency to computing devices. Edge computing may correspond to location-specific applications and data, including a general or specific-purpose computing device, storage, and other operations to utilize those components, closer to end users on a network and/or using IoT endpoints, devices, and/or sensors. This allows for better application performance and faster provision of data from an edge storage node, thereby enhancing and improving experiences and quality of network usage for the applications and data. This may also improve efficiency and speed in delivering content to users. In one embodiment, an edge computing node may be provided by a cellular network (e.g., 5G, however, other cellular networks may also be utilized). Edge computing systems and nodes may also be provided by cloud computing systems, such as Amazon AWS®, Microsoft Azure®, and the like.

Online merchant platforms 1500 may correspond to one or more online merchant marketplaces, sales platforms, websites, and/or resources where a user may visit in order to shop for items. For example, online merchant platforms 1500 may correspond to one or more websites and/or application accessible digital platforms where a user may offer products, services, and other items for sale and users may browse items, select items for purchase, and engage in electronic transaction processing. Online merchant platforms 1500 may further include other online platforms, websites, and resources that may allow users to engage in electronic transaction processing, such as those associated with payment processors, transfers of funds, payment of utilities or living expenses, and other payments or purchases that may be used by users and may require payment of a balance due for some product, service, or other item. In this regard, online merchant platforms 1500 may be used to detect and/or determine user activities 1320 that may correspond to virtual and/or digital activities by users when engaging in electronic transaction processing.

Other online platforms that may be associated with online transaction processor 1200 and/or online merchant platforms 1500 may correspond to or be associated with blockchains and/or cryptocurrency payment networks, which may be used to establish and process cryptocurrency sales and/or exchanges for different currencies. For example, distributed network participants may correspond to networks of devices that may communicate to share, update, and maintain a distributed ledger for a blockchain and cryptocurrency. In this regard, the distributed network participants may include transaction participants and miners, where transaction participants may process transactions to exchange and/or pay amounts of funds in fiat currencies, cryptocurrencies, and/or virtual currencies. A record may be required to be generated, updated, and maintained on a blockchain, which requires a level one network and/or level two network and allows miners to validate and broadcast the transactions and records over the distributed ledger for the blockchain. The level one network may correspond to a base network where transactions are persisted in block records when processed, such as a Bitcoin network and protocol. Further, distributed network participants may include a layer two network, such as a Lightning network, that may reside on top of processing for the layer one network for the allow for additional data broadcasting, recording, monitoring, and/or processing.

Network 1600 may be implemented as a single network or a combination of multiple networks. For example, in various embodiments, network 1600 may include the Internet or one or more intranets, landline networks, wireless networks, and/or other appropriate types of networks. Thus, network 1600 may correspond to small scale communication networks, such as a private or local area network, or a larger scale network, such as a wide area network or the Internet, accessible by the various components of system 1000.

Although various components of system 1000 are described separately, functionality of the various components may be combined and/or performed by a single component and/or multiple computing devices in communication without departing from the invention.

Figure 11:
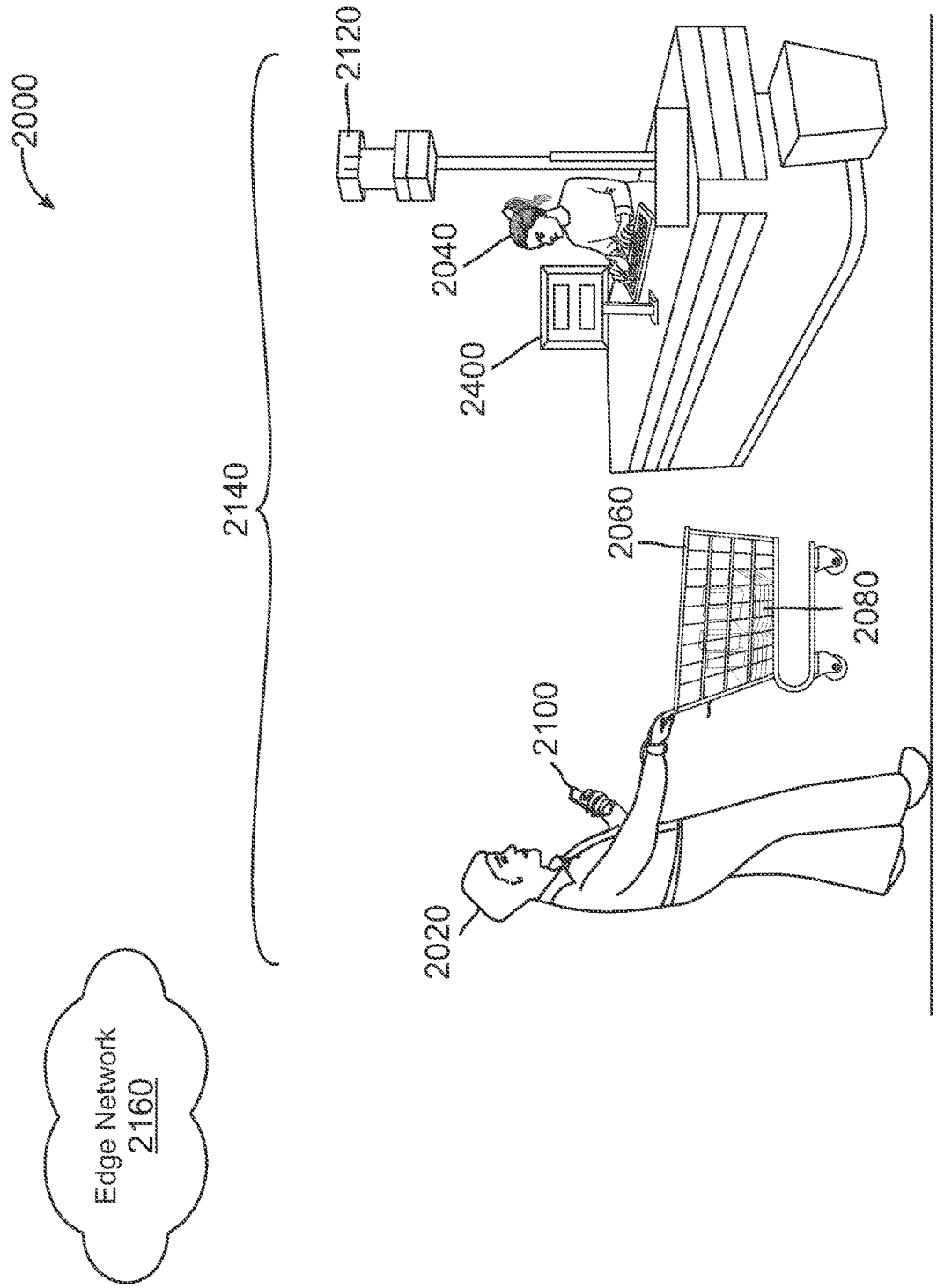
FIG. 11 illustrates an exemplary real-world environment where user activities are detected for locking cryptocurrency conversions for cryptocurrency available to users, according to an embodiment.

FIG. 11 illustrates an exemplary real-world environment 2000 where user activities are detected for locking cryptocurrency conversions for cryptocurrency available to users, according to an embodiment. In real-world environment 2000, a user 2020 may utilize a mobile computing device 2100, which may generally correspond to client device 1100 from system 1000 of FIG. 10. User 2020 may engage in one or more user activities in real-world environment 2000, which may be analyzed to predict whether the user will engage in electronic transaction processing and further require or request an amount of funds in a currency to process a transaction in real-world environment 2000.

For example, user 2020 may visit a merchant location corresponding to real-world environment 2000 and may engage in activities that indicate that the user will purchase an item or otherwise engage in a transaction with a merchant 2040 using client device 110. For example, user 2020 may utilize a shopping cart 2060 to add items 2080 to shopping cart 2060 for purchase. Items 2080 may be added and may be detected using an RFID or NFC scanner and corresponding chips and/or antennas, scanning or capturing an image of items 2080 and/or shopping cart 2060 having items 2080, and/or through short range wireless signaling between mobile computing device 2100, shopping cart 2060 and/or items 2080. Each of these activities of selecting and/or adding items 2080 for shopping cart 2060 may indicate a corresponding intent to purchase those items and therefore may be used to predict that user 2020 will engage in electronic transaction processing in real-world environment 2000.

Similarly, user 2020 may approach merchant 2040 to checkout for items, order items, and/or purchase items, which would require payment of a total or amount due for the selected products, services, and/or other items for purchase by the user. User 2020 may be detected as approaching merchant 2040 by one or more devices and/or sensors including a wireless transceiver 2120 or other wireless beacon configured to wireless detect and/or communicate with mobile computing device 2100. This may utilize an "always on" type communication technology, such as Bluetooth Low Energy or LTE Direct in order to exchange tokens and perform a handshake. Other sensors and/or device may be located in a checkout are 2140 that may interact and/or detect user 2020 and/or mobile computing device 2100. For example, a merchant computing device 2400 may communicate with, scan, and/or interface with mobile computing device 2100 and/or items 2080, as well as capture images or other data for user 2020 to detect user 2020 as checking out and determine the transaction data for a transaction to be processed by user 2020 with merchant 2040. An edge network 2160 may also be used to detect and store on an edge storage node the user activities and/or other user data, as well predict whether a user will engage in electronic transaction processing. This may include those user activities used to determine whether a user will engage in electronic transaction processing and the transaction parameters, purchases, and/or data. For example, items of interest to the user, shopping lists, and the like may be stored by edge network 2160.

A service provider may utilize these user activities to determine that user 2020 will engage in electronic transaction processing with merchant 2040. Further, the service provider may determine, through a detected transaction, input items and/or costs for the transaction, items of interest and/or selected by the user (e.g., through scanned or detected items in shopping cart 2060 and/or provided to or scanned by merchant 2040 for the transaction), a transaction total or other cost associated with the transaction. The service provider may determine that this total, amount due, and/or other costs required a payment of an amount of funds in a specific currency, such as one or more currencies accepted by merchant 2040 (e.g., fiat, cryptocurrency, virtual currency, etc.). These accepted currencies may correspond to a location of real-world environment 2000 (e.g., a country with corresponding currency) and/or the accept transaction processing rules and parameters for merchant 2040.

In order to process the transaction predicted for user 2020 for the determined total, the service provider may further determine that the user may want to convert or sell at least one cryptocurrency to obtain the amount of funds for the transaction in the accepted currency. Prediction of the cryptocurrency may be based on preferences set by user 2020, past sales and/or purchases of cryptocurrency by user 2020, sale prices and/or exchange rates and their corresponding trends in past performance for different cryptocurrencies or other currencies, and/or other data that may indicate cryptocurrencies that are desirable to sell or exchange to user 2020 and those that are not. Once the cryptocurrency is selected, a stable price or rate is locked-in for user 2020, which is a price or rate that is to be limited or prevented from fluctuation over a time period that is anticipated for processing the transaction electronically with merchant 2040 (e.g., the next five to thirty minutes). This allows a notification to be transmitted to user 2020 having information for the locked price or rate and the time period, as well as a selectable user interface element or the like to cause the exchange or sale of cryptocurrency.

Figure 12:
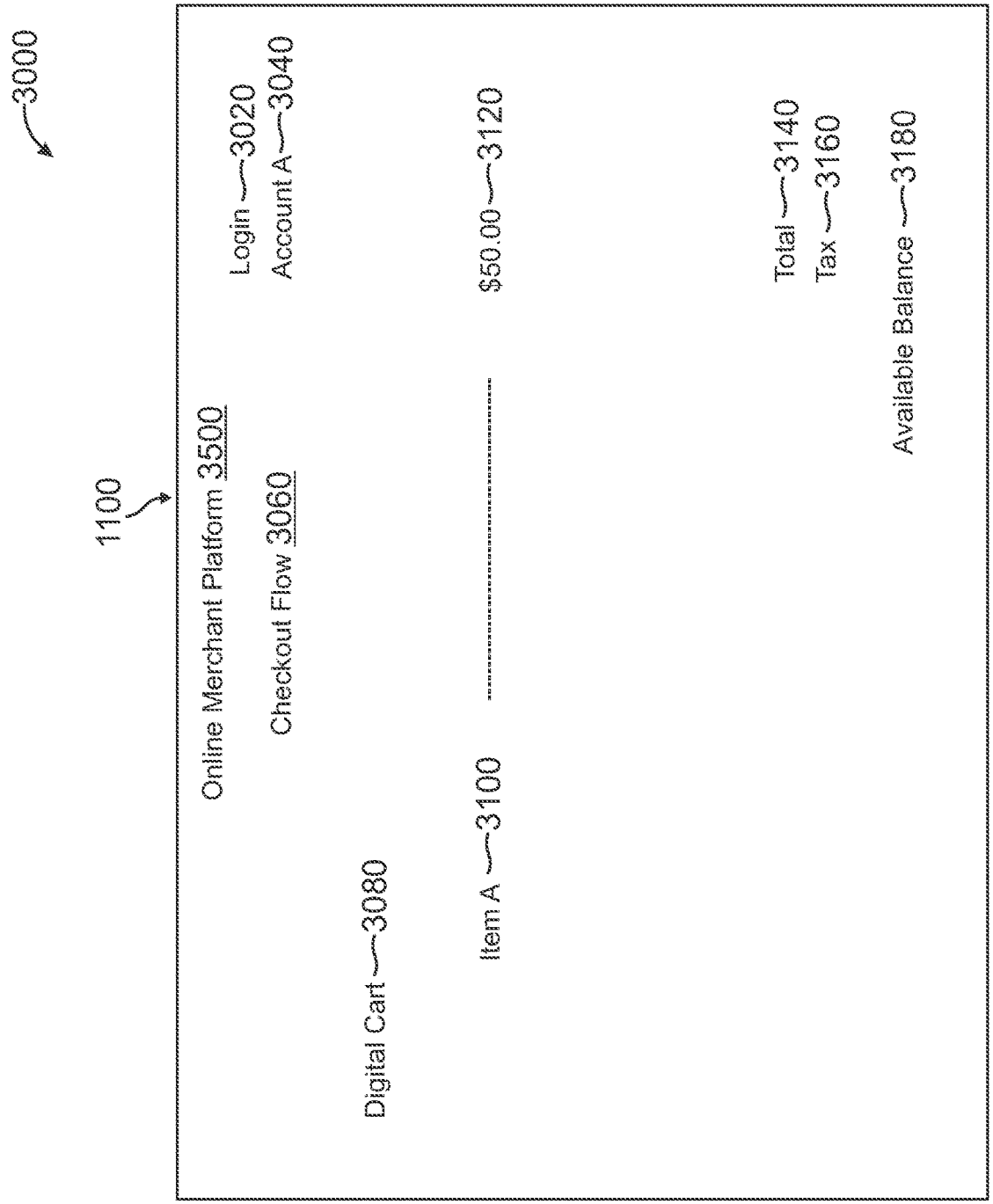
FIG. 12 illustrates an exemplary interface of a computing device for digital environments where user activities are detected for locking cryptocurrency conversions for cryptocurrency available to users, according to an embodiment.

FIG. 12 illustrates an exemplary interface 3000 of a computing device for digital environments where user activities are detected for locking cryptocurrency conversions for cryptocurrency available to users, according to an embodiment. In interface 3000, a user may utilize client device 1100 from system 1000 of FIG. 10. The user may engage in one or more user activities via a digital platform, website, and/or resident device software application, which may be analyzed to predict whether the user will engage in electronic transaction processing and further require or request an amount of funds in a currency to process a transaction via interface 3000. An online merchant platform 3500 accessed via interface 3000 may correspond to generally to one or more of online merchant platforms 1500 in system 1000.

In this regard, the user utilizing client device 1100 may access an application, such as a dedicated software application or a browser application, to access data, operations, and resources for online merchant platform 3500. This may be accessible from a website, application datastore and resource, and/or the like, and may further correspond to a merchant marketplace, sales portal, or the like that may offer items for sale to users. For example, via online merchant platform 3500, the user may perform a login 3020 to an account A 3040 in order to purchase items using funds and/or electronic transaction processing features of a service provider that are accessible using account A 3040. Further, login 3020 may enable entering, engaging in, and/or processing a checkout flow 3060 using account A 3040, which may indicate a user's intent in performing electronic transaction processing via interface 3000 on online merchant platform 3500.

Further, when processing checkout flow 3060 on online merchant platform 3500, a user may utilize a digital cart 3080 to add an item A 3100 to digital cart 3080 in order to perform online digital checkout for item A 3100. A cost 3120 may be set for item A 3100, which may cause digital cart 3080 during checkout flow 3060 to provide a total 3140 and a tax 3160. This information may further be used to predict that the user may perform electronic transaction processing via user interface 3000 on online merchant platform 3500. Further, the information for cost 3120, total 3140, and/or tax 3160 may each be used to determine an amount of funds, as well as a type of currency, required for payment of the transaction during checkout flow 3060. This may be used when determining a type and amount of cryptocurrency that is to be sold or exchanged for the amount of the currency, as well as parameters for the sale price or exchange rate for the cryptocurrency that is to be offered to the user. An available balance 3180 may be used to show available balances of different currencies, whether cryptocurrency, virtual, or fiat, so that a user may determine whether they would like to accept an offer for a price or rate for cryptocurrency to be converted into the currency used for the transaction.

In a similar manner to FIG. 12, a service provider may utilize these user activities to determine that the user will engage in electronic transaction processing via interface 3000 on online merchant platform 3500. The transaction parameters (e.g., total, fees, currency, etc.) may be determined from the information in interface 3000. The service provider may determine that this total, amount due, and/or other costs required during checkout flow 3060 in order to transmit a notification or message having an offer to sell or exchange an amount of cryptocurrency owned or available to the user in order to complete the transaction in checkout flow 3060. These accepted currencies may correspond to a location, nationality, or the like associated with online merchant platform 3500. Available balance 318 may be used to determine if the user does not have access to the amount of funds for the cryptocurrency and/or predict that the user would like to use the cryptocurrency for processing checkout flow 3060 based on preferences set by the user, past sales and/or purchases of cryptocurrency by the user, sale prices and/or exchange rates and their corresponding trends in past performance for different cryptocurrencies or other currencies, and/or other data that may indicate cryptocurrencies that are desirable to keep, sell, or exchange. A locked price or rate may be determined from cryptocurrency sales or exchanges and their corresponding prices or rates, as well as trends in the prices or rates. Thereafter, a message, notification, pop-up, interface window or element, or the like may be displayed by client device 1100 and/or with online merchant platform 3500 to show the locked price or rate and time period available for that offer, as well as provide a user interface element to accept and process the offer.

Figure 13:
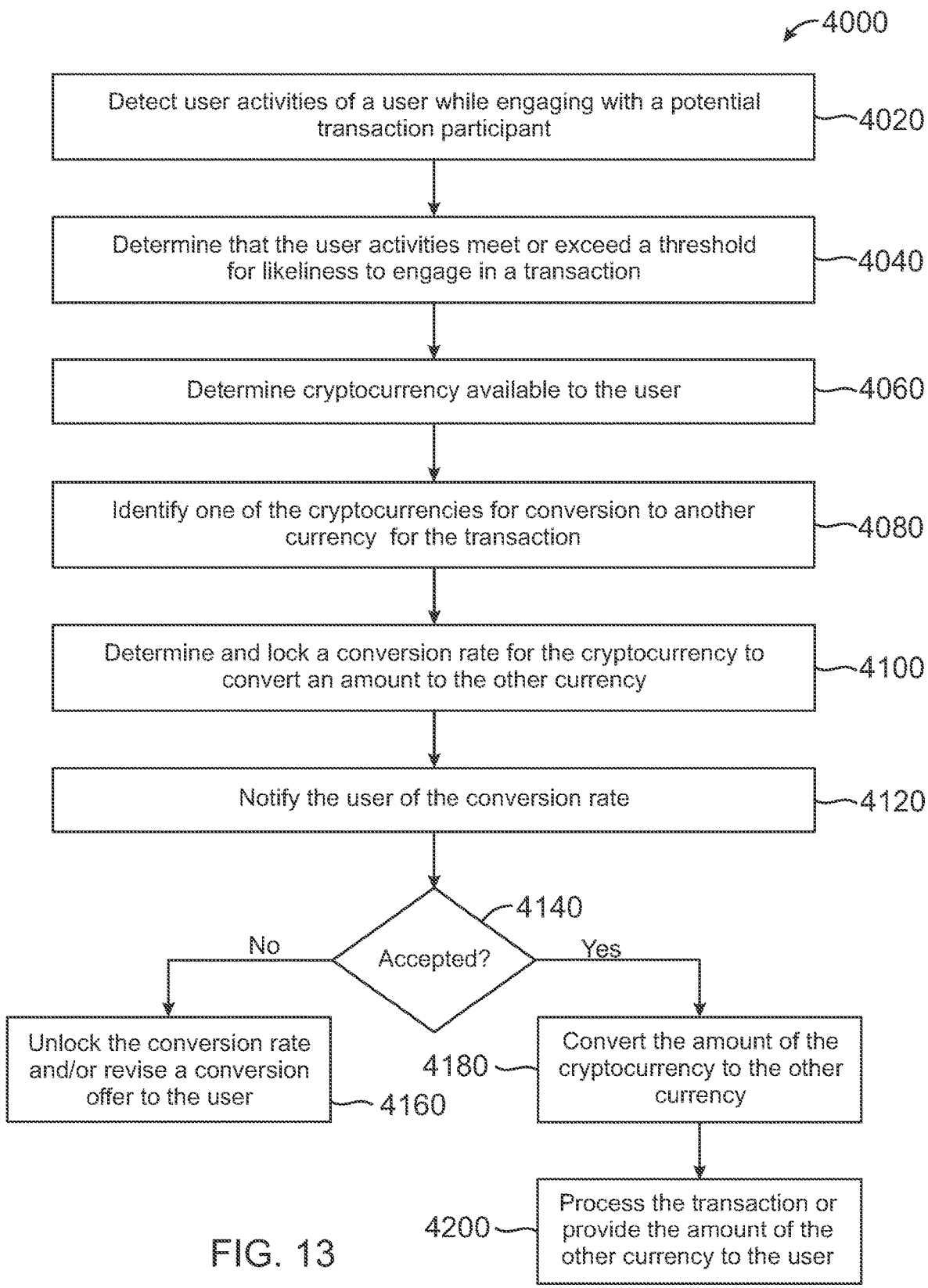
FIG. 13 illustrates a flowchart for user activity detection for locking cryptocurrency conversions, according to an embodiment.

FIG. 13 illustrates a flowchart 4000 for user activity detection for locking cryptocurrency conversions, according to an embodiment. Note that one or more steps, processes, and methods described herein of flowchart 4000 may be omitted, performed in a different sequence, or combined as desired or appropriate.

At step 4020 of flowchart 4000, user activities of a user are detected. The user activities may correspond to real-world activities that may be engaged in by a user at a physical merchant location or may be virtual or online activities that may be engaged in by the user with an online platform, merchant, website, application/application page or the like. In this regard, the user activities may correspond to those activities where a user may indicate their intent or desire to engage in electronic transaction processing for a transaction that requires an amount of funds in a currency to be paid for the transaction. Thus, the user activities may include activities that are associated with selecting items for purchase, initiating or engaging in a checkout or payment flow or process, generating a transaction and/or determining a transaction total, and other activities that indicate an upcoming payment due by the user for electronic transaction processing. At step 4040 of flowchart 4000, it is determined that the user activities meet or exceed a threshold for likeliness to engage in a transaction. For example, a score or other predictive output may be determined using a rules-based on ML/NN model-based engine and system, which may take as input the user activities and other data for the user and/or potential transaction. An output score may be determined and that score may be compared to or analyzed using a threshold score or value that may be set for identification of whether a user is predicted to engage in the transaction. If the threshold is met or exceeded by the output score, the service provider or other online transaction processor may then predict that the user will engage in electronic transaction processing.

At step 4060, cryptocurrency available to the user is determined. For example, a digital wallet, account with an online cryptocurrency exchange platform, another digital account of the user with an online transaction processor, and the like may be accessed and/or information for available assets in these resources may be determined. The available cryptocurrencies and/or balances for the cryptocurrencies may be identified using this information, as well as any other balance of other currencies. When accessing this information, other information about cryptocurrency sales or purchases by the user, preferences for use, sale, or purchase of cryptocurrencies by the user, and the like may also be retrieved for the user and/or different accounts and wallets of the user. At step 4080, one of the cryptocurrencies is identified for conversion to another currency for the transaction. When identifying a cryptocurrency for sale or exchange to obtain the other currency, the service provider or online transaction processor may predict a cryptocurrency the user may want to use, sell, or otherwise exchange and convert to the other currency. This may be based on the aforementioned information about user preferences, past sales and/or purchase of cryptocurrencies and trends by the user, current prices or rates of cryptocurrencies, and/or available cryptocurrency and/or fiat/virtual currency balances. Further, based on values and/or trends in sale prices and/or conversion rates, the transaction processor may also predict a "best" or most preferential to convert on behalf of the user, for example, to obtain the best return or value of the other currency. In this regard, one or more rules or models may be built in order to predict, from past prices and rates, current and/or future prices, rates, and/or values predicted for the cryptocurrency. This may allow for predictive behaviors and trends in cryptocurrency prices to select a cryptocurrency to convert to the other currency. Additionally, as stated above, a user's preferences may be taken into account in determining a cryptocurrency for conversion. For example, a user profile may identify a priority list associated with his/her crypto holdings and may therefore denote, in some order, a preference as to which cryptocurrency(s) should be sold in a given situation. In addition, the user profile may denote a risk profile or investment profile that may be utilized in determining which cryptocurrency to sell. For example, if a first cryptocurrency has gone up 100% in the past month, while a second cryptocurrency has gone down, the investment profile or risk profile may be analyzed along with the past performance of the cryptocurrencies to identify whether to utilize the first cryptocurrency or the second cryptocurrency (with regard to an upcoming transaction). In one example, the method may determine to utilize the first cryptocurrency if an investment profile of the user has a target of 100% as a desired gain for the first cryptocurrency.

At step 4100, a conversion rate (or sale price) for the cryptocurrency to convert to an amount of the other currency is determined and locked-in for the user. In one embodiment, a conversion price is determined based on a real time price corresponding to the cryptocurrency. This conversion price may be locked in by a service provider for a first time period. In other embodiments, the conversion rate may be determined by analyzing past values, behaviors, patterns, and/or trends in cryptocurrency pricing on one or more cryptocurrency exchanges and predicting or forecasting an upcoming price for the cryptocurrency over a time period that the price would be offered to the user. Since the cryptocurrency price on the exchange may fluctuate, the price may be predicted using one or more rules and/or models to forecast future prices from past prices, as well as one or more pricing policies for the transaction processor. Those policies may be implemented to minimize risk to the transaction processor for price fluctuations and/or a net balance policy so that customers of the transaction processor are not adversely affected by cryptocurrency price fluctuations.

At step 4120, the user is notified of the conversion rate. This may include notifying the user of the amount of time during which the conversion rate is valid and locked, after which the conversion rate may expire or be extended based on a request or a further predicted price, as well as providing the user with a user interface element (e.g., link, menu selection, selectable icon, etc.) that enables the user to accept the offer. The notification may be transmitted to a computing device of the user, such as a mobile device in possession of the user at a physical location where the user may be engaging in electronic transaction processing, and/or the computing device being used by the user during online digital activities where the user may be engaging in electronic transaction processing.

At step 4140, it is determined whether the conversion rate and/or offer was accepted by the user or whether the conversion rate expired or was declined. For example, if expired or declined, at step 416, the conversion rate is unlocked and/or a conversion offer is revised for the user. Unlocking the conversion rate may include expiring and making the rate unavailable so that the user is no longer able to accept the offer and request the sale or exchange of the cryptocurrency via the user interface element or another operation. However, the transaction processor may also extend the offer by allowing the conversion rate to be extended. This may be based on an action by the user, such as a request for additional time, and/or based on a prediction in cryptocurrency price on the exchange for a further period of time. Thus, the offer may be extended if desired by the user and/or transaction processor.

However, if accepted at step 4140, at step 4180, the amount of the cryptocurrency is converted to the other currency. This may include selling the amount of the cryptocurrency on a cryptocurrency exchange platform and/or otherwise exchanging or converting the amount into the other currency to be used for the transaction. The price of the cryptocurrency may be dictated by the market at the time of the sale, and thus any fluctuations (e.g., decreases in value) on the exchange may be required to be covered by the transaction processor. However, if the value has increased, either a smaller amount of the cryptocurrency may be used, a resulting larger balance of the other currency may be provided to the user, or the resulting larger balance may be used to enforce the net zero balance policy of the transaction processor. At step 4200, the transaction is processed, or the amount of the other currency is provided to the user. The transaction processor may immediately execute one or more operations to process and complete the electronic transaction processing. However, if the user is not ready to checkout or would like to further shop and/or review checkout details, a balance of the other currency in the user's account or digital wallet may be increased by the resulting sale or exchange of the cryptocurrency.

Figure 14:
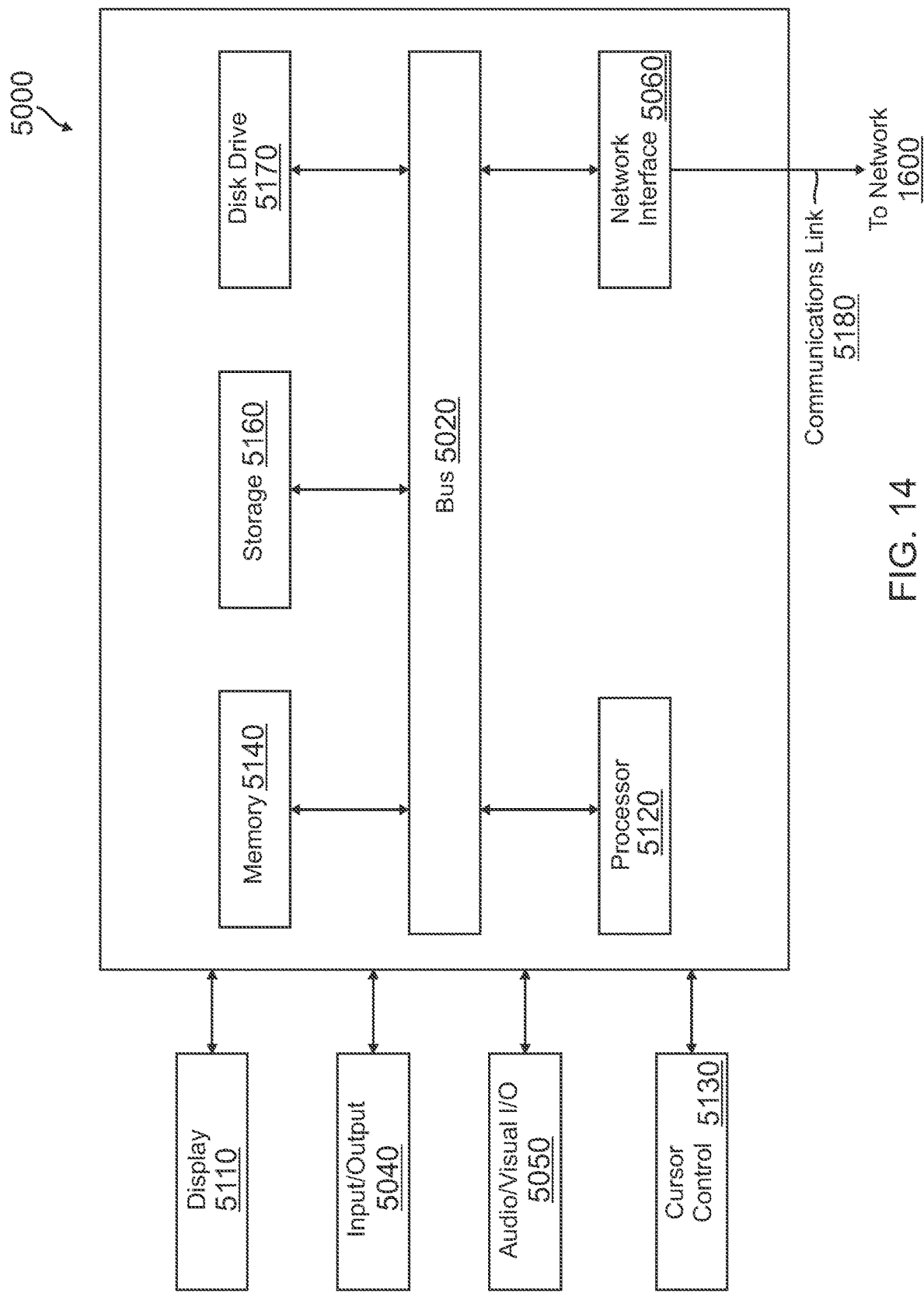
FIG. 14 illustrates a block diagram of a computer system suitable for implementing one or more components in FIG. 1, according to an embodiment.

FIG. 14 is a block diagram of a computer system 5000 suitable for implementing one or more components in FIG. 10, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 5000 in a manner as follows.

Computer system 5000 includes a bus 5020 or other communication mechanism for communicating information data, signals, and information between various components of computer system 5000. Components include an input/output (I/O) component 5040 that processes a user action, such as selecting keys from a keypad/keyboard, selecting one or more buttons, image, or links, and/or moving one or more images, etc., and sends a corresponding signal to bus 5020. I/O component 5040 may also include an output component, such as a display 5110 and a cursor control 5130 (such as a keyboard, keypad, mouse, etc.). An optional audio input/output component 5050 may also be included to allow a user to use voice for inputting information by converting audio signals. Audio I/O component 5050 may allow the user to hear audio. A transceiver or network interface 5060 transmits and receives signals between computer system 5000 and other devices, such as another communication device, service device, or a service provider server via network 1600. In one embodiment, the transmission is wireless, although other transmission mediums and methods may also be suitable. One or more processors 5120, which can be a micro-controller, digital signal processor (DSP), or other processing component, processes these various signals, such as for display on computer system 5000 or transmission to other devices via a communication link 5180. Processor(s) 5120 may also control transmission of information, such as cookies or IP addresses, to other devices.

Components of computer system 5000 also include a system memory component 5140 (e.g., RAM), a static storage component 5160 (e.g., ROM), and/or a disk drive 5170. Computer system 5000 performs specific operations by processor(s) 5120 and other components by executing one or more sequences of instructions contained in system memory component 5140. Logic may be encoded in a computer readable medium, which may refer to any medium that participates in providing instructions to processor(s) 5120 for execution. Such a medium may take many forms, including but not limited to, non-volatile media, volatile media, and transmission media. In various embodiments, non-volatile media includes optical or magnetic disks, volatile media includes dynamic memory, such as system memory component 5140, and transmission media includes coaxial cables, copper wire, and fiber optics, including wires that comprise bus 5020. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 5000. In various other embodiments of the present disclosure, a plurality of computer systems 5000 coupled by communication link 5180 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory; and
    one or more hardware processors coupled to the non-transitory memory and configured to read instructions from the non-transitory memory to cause the system to perform operations comprising:
        monitoring a website or an application;
        predicting that a user will perform a checkout for a transaction requiring a first amount of a first currency on the website or in the application;
        in response to predicting that the user will perform a checkout for the transaction:
            predicting, using an artificial intelligence (AI) model, that a first cryptocurrency of a plurality of cryptocurrencies available through a digital wallet of the user is a preferred cryptocurrency to convert to the first currency for the checkout based on a cryptocurrency conversion or a cryptocurrency sale policy to attempt to achieve a net zero balance on behalf of the system after selling or converting the plurality of cryptocurrencies into other currencies;
            determining a first conversion rate of the first cryptocurrency to the first currency;
            determining, based on the first conversion rate, a second amount of the first cryptocurrency that corresponds to the first amount of the first currency;
            locking, for the user using encryption keys that, when shared, each provide access to a respective one of the first amount of the first currency or the second amount of the first cryptocurrency, the first conversion rate for converting the first cryptocurrency to the first currency for a first time period, wherein the encryption keys require an approval from a first party and a second party for a conversion of the second amount of the first cryptocurrency to the first amount of the first currency, wherein the locking includes securing the first amount and the second amount in a temporary locking mechanism for the conversion using the encryption keys;
            for maintaining the net zero balance of available cryptocurrency, establishing a first value for the first cryptocurrency when the first conversion rate is locked;
            transmitting, to the user, a notification including a first user interface element for the approval of the conversion of the second amount of the first cryptocurrency to the first amount of the first currency, wherein the notification identifies the first time period available for the conversion; and
            executing the conversion of the second amount of the first cryptocurrency from the digital wallet of the user to the first amount of the first currency based on the approval for the conversion via the first user interface element, wherein the executing the conversion comprises:
                unlocking the temporary locking mechanism for access to the first amount and the second amount using the encryption keys,
                converting the second amount of the first cryptocurrency to the first currency at a second conversion rate that is currently available for the converting after the unlocking, and
                updating the available cryptocurrency for the net zero balance based on any insufficient amount or any excess amount of the established first value for the first cryptocurrency that remains after the converting, wherein the established first value was set for maintaining the net zero balance when the first conversion rate was locked; and
            processing the checkout of the transaction using the first amount of the first currency after the executed conversion, wherein the processed checkout completes the transaction on the website or in the application.

2. The system of claim 1, wherein the determining the first conversion rate comprises:
    determining historical conversion rate data for the first cryptocurrency with at least one cryptocurrency exchange platform; and
    predicting the first conversion rate for the first cryptocurrency during the first time period based on the historical conversion rate data for the first cryptocurrency with the at least one cryptocurrency exchange platform, wherein the first conversion rate is independent of a current conversion rate of the first cryptocurrency at one or more points in time during the first time period.

3. The system of claim 2, wherein the predicting the first conversion rate is further based on a cryptocurrency conversion policy for an online transaction processor associated with the system, and wherein the cryptocurrency conversion policy is based at least on maintaining the net zero balance after converting one or more cryptocurrencies on behalf of users of the online transaction processor.

4. The system of claim 1, wherein the operations further comprise:
receiving, during the first time period, a selection of the first user interface element, wherein the selection causes the second amount of the first cryptocurrency to be converted to the first amount of the first currency for the checkout, wherein the processing the checkout for the transaction using the first amount of the first currency is based on the selection.

5. The system of claim 4, wherein the locking the first conversion rate comprises digitally placing the first amount of the first currency and the second amount of the first cryptocurrency in a storage corresponding to the temporary locking mechanism that utilizes a hash-based digital locking using the encryption keys, and wherein the converting the second amount of the first cryptocurrency to the first amount of the first currency comprises exchanging the encryption keys for unlocking the hash-based digital locking for an exchange of the second amount of the first cryptocurrency to the first amount of the first currency.

6. The system of claim 4, wherein the converting the second amount of the first cryptocurrency to the first amount of the first currency comprises selling the second amount of the first cryptocurrency using a cryptocurrency exchange service.

7. The system of claim 1, wherein prior to determining the first conversion rate, the operations further comprise:
determining a plurality of cryptocurrencies available to the user; and
selecting the first cryptocurrency for the checkout over at least one second cryptocurrency of the plurality of cryptocurrencies based on one of a user preference for a use of the first cryptocurrency, a trend in pricing of at least one of the plurality of cryptocurrencies, or a selling volume of the plurality of cryptocurrencies.

8. The system of claim 1, wherein prior to determining the first conversion rate, the operations further comprise:
predicting that the user will select the first cryptocurrency for converting to the first currency during the checkout based on at least one of a purchase or a sale of the first cryptocurrency within a second time period, an available balance of the first cryptocurrency or the first currency, one or more available fiat balances for the user, an indication to use the first cryptocurrency for the transaction, or a preference to sell the first cryptocurrency.

9. The system of claim 1, wherein the first currency comprises one of a second cryptocurrency or a fiat currency accepted during the checkout for the transaction.

10. The system of claim 1, wherein the predicting that the user will perform the checkout for the transaction comprises determining that a combination of at least two user activities on the website or in the application meet or exceed a predictive threshold.

11. The system of claim 10, wherein the at least two user activities comprise at least one of online digital activities with an online merchant detected over a network or real-world activities from one of a device or an edge network associated with a physical location of a merchant, and wherein the at least two user activities further comprise at least one of a selection of an item for purchase, a transaction processing flow for the checkout using an account of the user, or a generation of the transaction for the user.

12. A method comprising:
monitoring one of a merchant website or a merchant application;
predicting, by a transaction processor, that a user will perform an electronic transaction processing of a digital transaction within a time period via the one of the merchant website or the merchant application;
in response to predicting that the user will perform the electronic transaction processing:
predicting, using an artificial intelligence (AI) model, that a cryptocurrency of a plurality of cryptocurrencies is a preferred cryptocurrency to convert for the digital transaction based on a cryptocurrency conversion or a cryptocurrency sale policy to attempt to achieve a net zero balance on behalf of the transaction processor after selling or converting the plurality of cryptocurrencies into other currencies;
determining a value of the cryptocurrency in another currency over the time period;
determining, based on the value, a first amount of the cryptocurrency for the electronic transaction processing of the digital transaction within the time period using a second amount of the other currency;
locking, with the transaction processor, the value available to the user for the cryptocurrency during the time period using encryption keys that, when shared, each provide access to a respective one of the first amount of the cryptocurrency or the second amount of the other currency, wherein the locking includes securing the first amount and the second amount in a temporary locking mechanism using the encryption keys;
for maintaining the net zero balance of available cryptocurrency, establishing the value for the cryptocurrency when locked;
transmitting a notification to the user of the value available to the user during the time period for the electronic transaction processing of the digital transaction using the cryptocurrency, wherein the notification comprises a user interface element that is selectable to execute an operation to perform the electronic transaction processing of the digital transaction by converting the first amount of the cryptocurrency to the second amount of the other currency;
unlocking the temporary locking mechanism for the access to the respective one of the first amount of the cryptocurrency or the second amount of the other currency using the encryption keys based on a selection of the user interface element; and
updating the available cryptocurrency for the transaction processor after the unlocking for the net zero balance, wherein the established value was set for maintaining the net zero balance when locked; and
processing the electronic transaction using one of the first amount of the cryptocurrency or the second amount of the other currency after the unlocking.

13. The method of claim 12, wherein the determining the first amount of the cryptocurrency comprises determining a transaction total for the digital transaction, and wherein the method further comprises:
monitoring, over the time period, variable values of the cryptocurrency;

receiving, during the time period, the selection of the user interface element;

converting the first amount to the second amount by:
obtaining the second amount of the other currency from a cryptocurrency exchange service at a current conversion rate using the cryptocurrency; and
processing the digital transaction for the transaction total using the second amount of the other currency,
wherein the updating the available cryptocurrency is based on any insufficient amount or any excess amount after the converting.

14. The method of claim 12, wherein the value is a predicted value over the time period based on one or more trends in past values of the cryptocurrency and a cryptocurrency conversion policy for sales or conversions of one or more cryptocurrencies by the transaction processor.

15. The method of claim 14, wherein the cryptocurrency conversion policy is established for the transaction processor in order to obtain the net zero balance for the sales or the conversions of the one or more cryptocurrencies.

16. The method of claim 14, wherein the one or more trends comprises at least one of a percentage change in cryptocurrency values over a previous time period, a moving average of the cryptocurrency values, a negative trend or a positive trend in the cryptocurrency values, a market capitalization of the one or more cryptocurrencies, or a trading volume of the one or more cryptocurrencies.

17. A non-transitory machine-readable medium having stored thereon machine-readable instructions executable to cause a machine to perform operations comprising:
monitoring one or more devices at a physical merchant location of a merchant;
predicting that a user will engage in a checkout for a transaction with the merchant at the physical merchant location within a time period;
in response to predicting that the user will engage in the checkout:
predicting, using an artificial intelligence (AI) model, that a cryptocurrency of a plurality of cryptocurrencies is a preferred cryptocurrency to convert to a fiat currency for the checkout based on a cryptocurrency conversion or a cryptocurrency sale policy to attempt to achieve a net zero balance after selling or converting the plurality of cryptocurrencies into other currencies;
determining, based on a conversion rate of the cryptocurrency available to the user to the fiat currency on a cryptocurrency exchange platform, a first amount of the cryptocurrency for a conversion to a second amount of the fiat currency required for electronic transaction processing of the transaction at the physical merchant location;
locking, for the time period, the conversion rate of the cryptocurrency for the user with the cryptocurrency exchange platform using encryption keys that, when shared, each provide access to a respective one of the first amount of the cryptocurrency or the second amount of the fiat currency, wherein the locking includes securing the first amount and the second amount in a temporary locking mechanism using the encryption keys;
for maintaining the net zero balance of available cryptocurrency, establishing a first value for the cryptocurrency when the conversion rate is locked;
transmitting, to the user, a notification including a selectable user interface element for the approval of the conversion, wherein the notification further includes the conversion rate available to the user for the cryptocurrency during the time period;
unlocking the temporary locking mechanism using the encryption keys for the access to the respective one of the first amount of the cryptocurrency or the second amount of the fiat currency; and
updating the available cryptocurrency after the unlocking for a net zero balance, wherein the established value was set for maintaining the net zero balance when the conversion rate was locked; and
processing the checkout of the transaction using one of the first amount of the cryptocurrency or the second amount of the fiat currency after the unlocking, wherein the processed checkout completes the transaction at the physical merchant location.

18. The non-transitory machine-readable medium of claim 17, wherein the operations further comprise:
monitoring, over the time period, the conversion rate of the cryptocurrency to the fiat currency;
receiving, during the time period, the selection of the selectable user interface element, wherein the selection requests the first amount of the cryptocurrency to be converted to the second amount of the fiat currency;
in response to the selection:
determining, based on the monitored conversion rate, a current conversion rate of the cryptocurrency;
converting, at the current conversion rate, the first amount of the cryptocurrency to the second amount of the fiat currency; and
providing the second amount of the fiat currency to one of a merchant account of the merchant for the checkout of the transaction or a payment account of the user,
wherein the updating the available cryptocurrency is based on any insufficient amount or any excess amount after the converting.

19. The non-transitory machine-readable medium of claim 17, wherein the locking the conversion rate of the cryptocurrency comprises establishing the conversion rate as available to the user over the time period independent of changes to the conversion rate for the cryptocurrency on the cryptocurrency exchange platform, and wherein the conversion rate is predicted based on a predicted average value of the conversion rate over the time period from previous conversion rates of the cryptocurrency to the fiat currency.

20. The non-transitory machine-readable medium of claim 17, wherein the one or more devices comprise at least one of a wireless transceiver configured to broadcast a short range wireless signal over a proximity range at the physical merchant location, a geo-location transceiver for the user, a mobile device of the user, a microphone, a camera, a biometric detector, a movement detector, or an Internet of Things sensor.

* * * * *